(12) United States Patent
Cideciyan et al.

(10) Patent No.: US 6,373,906 B1
(45) Date of Patent: Apr. 16, 2002

(54) METHOD AND APPARATUS FOR VITERBI DETECTION OF GENERALIZED PARTIAL RESPONSE SIGNALS INCLUDING TWO-WAY ADD/COMPARE/SELECT FOR IMPROVED CHANNEL SPEED

(75) Inventors: Roy Daron Cideciyan, Rueschlikon (CH); Jonathan Darrel Coker, Rochester, MN (US); Evangelos S. Eleftheriou, Zurich (CH); Richard Leo Galbraith, Rochester, MN (US); Allen Prescott Haar, Essex Junction; Frank Ray Keyser, III, Colchester, both of VT (US); David James Stanek, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/768,802

(22) Filed: Jan. 24, 2001

Related U.S. Application Data

(63) Continuation-in-part of application No. 09/697,467, filed on Oct. 26, 2000.

(51) Int. Cl.$^7$ .......................... H04L 27/06; H04D 1/00; G11C 29/00
(52) U.S. Cl. ........................ 375/341; 714/769
(58) Field of Search .................. 375/341; 314/769; 714/769

(56) References Cited

U.S. PATENT DOCUMENTS

| | | | |
|---|---|---|---|
| 5,257,272 A | * 10/1993 | Fredrickson | ................. 371/43 |
| 5,327,440 A | * 7/1994 | Fredrickson et al. | .......... 371/43 |
| 5,430,744 A | 7/1995 | Fettweis et al. | |
| 5,619,539 A | 4/1997 | Coker et al. | |
| 6,097,769 A | * 8/2000 | Sayiner et al. | ............... 375/341 |
| 6,104,766 A | * 8/2000 | Coker et al. | ................. 375/341 |
| 6,212,661 B1 | * 4/2001 | Rub et al. | .................... 714/769 |

OTHER PUBLICATIONS

T. Conway; Implementation of high speed Viterbi detectors, I.E.E.E. Nov. 25, 1999, vol. 35 No. 24, pp. 20892090.*
"Reduced–Complexity Viterbi Detector Architectures for Partial Response Signalling" by Fettweis et al., IEEE Globecom 1995 pp. 559–563.
"Adaptive Maximum–Likelihood Receiver for Carrier–Modulated Data–Transmission" by Gottfried Ungerboeck, IEEE Transactions on Communications, May 1974, pp. 624–636.

* cited by examiner

*Primary Examiner*—Stephen Chin
*Assistant Examiner*—Tony Al-Beshrawi
(74) *Attorney, Agent, or Firm*—Joan Pennington

(57) ABSTRACT

Apparatus is provided for implementing high-speed and area efficient architectures for Viterbi detection of generalized partial response signals including two-way add/compare/select for improved channel speed. The two-way add/compare/select includes a two-way compare for comparing first and second state metric input values and a pair of two-way adds in parallel with the two-way compare for respectively adding the first and second state metric input values with a second input value. The second input value includes a time varying term or a constant term. The time varying terms are expressed as outputs $Z_n$ of a partial matched filter or as outputs $W_n$ of a matched filter. A multiplexer is coupled to the pair of two-way adds, the multiplexer receiving a selectable input controlled by the two-way compare. A pair of shifts coupled between the pair of two-way adds and the multiplexer receive a shift control input for providing metric bounding to avoid underflow. The two-way compare for comparing first and second state metric input values can include a hard shift for providing an add for the first state metric input value and then a compare between a resultant first state metric input value and the second state metric input value.

12 Claims, 17 Drawing Sheets

METHOD AND APPARATUS FOR VITERBI DETECTION OF GENERALIZED PARTIAL RESPONSE SIGNALS INCLUDING TWO-WAY ADD/COMPARE/SELECT FOR IMPROVED CHANNEL SPEED

CROSS REFERENCE TO RELATED APPLICATION

This application is a continuation-in-part of patent application Ser. No. 09/697,467 filed on Oct. 26, 2000. The above-identified application is incorporated herein by reference.

FIELD OF THE INVENTION

The present invention relates generally to data detection methods and apparatus for generalized partial-response channels in a direct access storage device, and more particularly, relates to a general methodology and apparatus for implementing high-speed and area efficient architectures for Viterbi detection of generalized partial response signals using transformed metrics, such as the partial matched filter branch metrics and the matched filter branch metrics and including two-way add/compare/select for improved channel speed.

DESCRIPTION OF THE RELATED ART

Partial-response signaling with maximum-likelihood sequence detection techniques are known for digital data communication and recording applications. U.S. Pat. No. 5,619,539 discloses data detection methods and apparatus for a direct access storage device including an 8-state extended partial-response class 4 (EPR4) trellis with modified branch metrics based upon heuristics so that the number of nonzero trellis branch constants is reduced.

U.S. Pat. No. 5,430,744 discloses a Viterbi decoder having a recursive processor modified to process each node in a trellis of a partial-response coded signal via heuristics to shift the branch metric additions over the node to effectuate compare, select, add operation order on the predecessor survivor metrics terminating in that node, to compare the metrics of the predecessor sequences terminating in the node, to select a survivor sequence, and to add the shifted branch metrics to the metric of the selected survivor sequence.

A need exists for a methodology for implementing high-speed and area efficient architectures for Viterbi detection of generalized partial-response signals. It is desirable to provide a general methodology and apparatus for implementing high-speed and area efficient architectures for Viterbi detection of generalized partial response signals using partial matched filter branch metrics and matched filter branch metrics.

SUMMARY OF THE INVENTION

A principal object of the present invention is to provide a methodology for implementing high-speed and area efficient architectures for Viterbi detection of generalized partial response signals including two-way add/compare/select for improved channel speed. Other important objects of the present invention are to provide Viterbi detectors for generalized partial response signals including two-way add/compare/select for improved channel speed substantially without negative effect and that overcome many of the disadvantages of prior art arrangements.

In brief, apparatus is provided for implementing high-speed and area efficient architectures for Viterbi detection of generalized partial response signals including two-way add/compare/select for improved channel speed. The two-way add/compare/select includes a two-way compare for comparing first and second state metric input values and a pair of two-way adds in parallel with the two-way compare for respectively adding the first and second state metric input values with a second input value.

In accordance with features of the invention, the second input value includes a time varying term or a constant term. The time varying terms are expressed as outputs $Z_n$ of a partial matched filter or as outputs $W_n$ of a matched filter. A multiplexer is coupled to the pair of two-way adds, the multiplexer receiving a selectable input controlled by the two-way compare. A pair of shifts coupled between the pair of two-way adds and the multiplexer receive a shift control input for providing metric bounding to avoid underflow. The two-way compare for comparing first and second state metric input values can include a hard shift for providing an add for the first state metric input value and then a compare between a resultant first state metric input value and the second state metric input value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
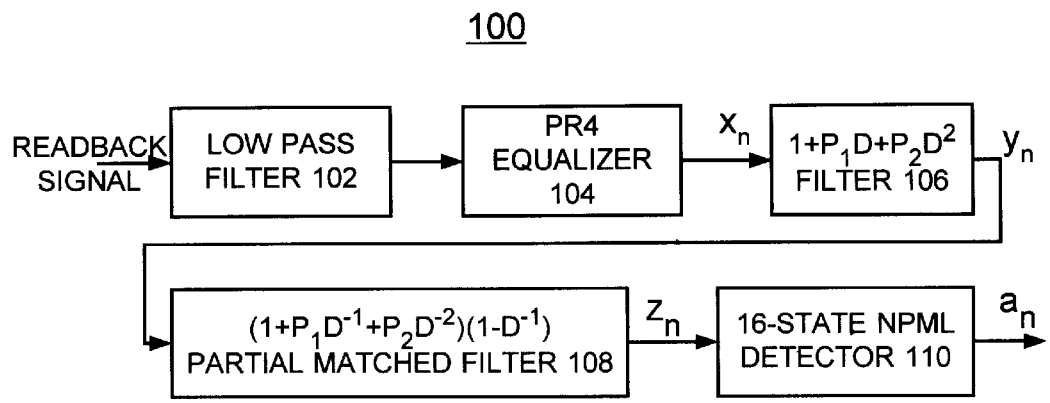
FIG. 1 is a block diagram representation illustrating a generalized partial-response data channel including a NPML 16-state detector for PR4 equalized signals using partial matched filter metric in accordance with the preferred embodiment.

In accordance with features of the invention, a general methodology for implementing high-speed and area efficient architectures for Viterbi detection of generalized partial-response signals is provided. Optimization of the Viterbi detector architecture achieves substantial reduction in hardware complexity and power consumption. The conventional Viterbi detector operating on an arbitrary generalized partial-response target with L coefficients requires $2^L$ states with $2^{L+1}$ branch metrics of the form $ay_n+c$ where the constants a and c are not necessarily the same for each trellis branch.

In accordance with features of the invention, the branch metrics are transformed so that some of the constant terms and all of the data dependent or time-varying terms are shifted after the add/compare/select (ACS) unit and added directly to the state metrics. There are only $2^{L-1}$ additions with data dependent or time-varying terms and at most $2^{L-1}$ additions with constant terms after the add/compare/select (ACS) units.

Furthermore, the branch metrics themselves become constants. There are only $2^{L-1}$ non-zero constants as branch metrics.

In accordance with features of the invention, it is shown that the state metrics of a Viterbi detector possess a time-invariance property which together with the distributive law min(a+x,b+x)=min(a,b)+x allows to shift the data dependent or time-varying terms of the branch metrics to the output of the add-compare-select (ACS) units and to also minimize the total number of non-zero constants on the trellis branches. For a given generalized partial response target the time-invariance property guarantees how to systematically find the minimum number of non-zero constants associated with the branch adders without resorting to heuristics. Furthermore, it provides a method for exhaustively determining all possible realizations of the data dependent or time-varying terms of the branch metrics, expressed as outputs of matched-filters or partial matched-filters. The time-invariance property also holds for Viterbi detectors that process multiple samples per trellis-branch thus allowing implementations at any desired speed. The application of the general methodology is illustrated with specific embodiments related to noise-predictive maximum-likelihood (NPML) or "fractional coefficient" detection with targets of the form $(1-D^2)(1+p1D+p2D^2)$ where p1 and p2 are arbitrary real numbers, not necessarily integers, with the corresponding detectors operating on a T or 2T basis, and extended partial response class 4 (EPR4) targets with a Viterbi detector operating on a 2T basis, where 1/T is the sample rate.

Consider a generalized partial response (PR) shaped signal in the presence of noise, that is:

$$y_n = a_n + \sum_{i=1}^{L} f_i a_{n-i} + \eta_n \tag{1}$$

where $a_n$ is the data symbol at time nT, $F(D)=(1+f_1D+f_2D^2+ \ldots +f_LD^L)$ is the generalized PR polynomial and an is the noise sample at the input of the detector. The Viterbi detector operating on $y_n$ will find the sequence $\{\hat{a}_n\}$ that minimizes the following metric:

$$J = \sum_n \left\{ y_n - \left( a_n + \sum_{i=1}^{L} f_i a_{n-i} \right) \right\}^2 \tag{2}$$

or equivalently minimize the metric:

$$J = -2\sum_n y_n \left( a_n + \sum_{i=1}^{L} f_i a_{n-i} \right) + \sum_n \left( a_n + \sum_{i=1}^{L} f_i a_{n-i} \right)^2 \tag{3}$$

For saturation recording systems the channel input $a_n$ is binary, that is +1 or −1. In this case the metric in equation (3) is simplified to $$J = -\sum_n y_n \left( a_n + \sum_{i=1}^{L} f_i a_{n-i} \right) + \sum_n \left( \sum_{i=1}^{L} f_i a_n a_{n-i} + \sum_{i=1}^{L} \sum_{j>i}^{L} f_i f_j a_{n-i} a_{n-j} \right) \tag{4}$$

where the first sum contains terms that depend on the channel output, referred to as data dependent or time-varying terms, and the second sum contains terms that do not depend on the channel output, referred to as constants. The following property is crucial in simplifying the architecture/implementation of the Viterbi detector. Observe that in general:

$$\sum_{n=0}^{\infty} y_n a_{n-i} = \sum_{n=-i}^{\infty} y_{n+i} a_n = \sum_{n=0}^{\infty} y_{n+i} a_n \tag{5}$$

is valid, where the last equality holds because of causality, i.e., $a_n=0$ for n<0. The property stated in equation (5) is called the "time-invariance" property of the state metrics. Note that this property can be independently applied to the two summation terms in equation (4). For a channel memory of L symbols, equation (5) suggests that there are L1 possible sets of data dependent or time-varying branch metric terms and $$\prod_{i=0}^{L-1}(L-i)^{L-i}$$

possible sets of branch constants within the window $a_n, \ldots a_{n-L}$. In order to optimize the Viterbi detector architecture with respect to speed and area one has to identify the set of data dependent or time-varying branch metric terms that shifts after the ACS unit and the set of branch metric constants with the maximum number of zeros. Since the set of all possible combinations is well defined and finite, the desired set of constants with the maximum number of zeros can be found, for example, via a computer search.

Consider now matched filter and partial matched filter transformations. Applying the time-invariance property to the first summation term in equation (4) one obtains:

$$J = -\sum_n a_n\left(y_n + \sum_{i=1}^{L} f_i y_{n+i}\right) + \tag{6}$$

$$\sum_n\left(\sum_{i=1}^{L} f_i a_n a_{n-i} + \sum_{i=1}^{L-1}\sum_{j>i}^{L} f_i f_j a_{n-i} a_{n-j}\right)$$

Let $$W_n = y_n + \sum_{i=1}^{L} f_i y_{n+i} \tag{7}$$

Clearly, $W_n$ represents the output of a filter matched to the generalized PR channel polynomial F(D). Substituting equation (7) into equation (6) we obtain:

$$J = -\sum_n a_n W_n + \sum_n\left(\sum_{i=1}^{L} f_i a_n a_{n-i} + \sum_{i=1}^{L}\sum_{j>i}^{L} f_i f_j a_{n-i} a_{n-j}\right) \tag{8}$$

The above transformed metric achieves that the channel output dependent term of the branch metric, i.e., $a_n W_n$ can be shifted after the ACS unit leaving on the trellis branches only constants.

Consider, as a second example, a generalized PR polynomial of the following form:

$$F(D)=(1-D^2)(1+p_1 D+p_2 D^2+ \ldots +p_{L-2}D^{L-2})=(1-D^2)P(D) \tag{9}$$

where the coefficients $p_1, p_2, \ldots p_{L-2}$ are usually selected so that the noise at the input of the detector is as white as possible. In this case the coefficients $p_1, p_2, \ldots p_{L-2}$ are the predictor coefficients and the polynomial P(D) is the whitening filter of order L−2. In this example let $$Z_n = y_n + \sum_{i=1}^{L-2} p_i y_{n+i} \tag{10}$$

denote the output of a filter which is matched only to the filter P(D), so that it is partially matched to the channel polynomial F(D). Using the time-invariance property stated in equation (5) and the partial matched-filter signal $Z_n$ the following equivalent metric is obtained:

$$J = -\sum_n(a_n - a_{n-2})Z_n + \tag{11}$$

$$\sum_n\left(\sum_{i=1}^{L} f_i a_n a_{n-i} + \sum_{i=1}^{L-1}\sum_{j>i}^{L} f_i f_j a_{n-i} a_{n-j}\right)$$

As in the matched-filter case, the transformed metric in equation (11) achieves that the channel output dependent term of the branch metric, that is, $Z_n(a_n-a_{n-2})$ can be shifted after the ACS units leaving on the trellis branches only constants. Clearly, there are other partial matched-filter transformations that can be applied to the metric in equation (6) such as, (1−D)P(D), (1+D)P(D), and the like.

Applying the time-invariance property to the second summation term in equation (8) so that an comes out as a common factor we obtain the equivalent metric:

$$J = -\sum_n a_n W_n + \sum_n\left(a_n \sum_{i=1}^{L} s_i a_{n-i}\right) \tag{12}$$

where $s_i$, i=1, 2, . . . , L are the one sided coefficients of the autocorrelation function of the generalized PR polynomial F(D), that is:

$$s_i = f_i + \sum_{j=1}^{i+j\leq L} f_j f_{i+j}, \quad i = 1, 2, \ldots, L \tag{13}$$

This particular metric in equation (12) is known in the literature as the matched filter metric.

In accordance with preferred embodiments for T-processing, for NPML or "fractional-target" 16-state detection with two predictor coefficients the target function is:

$$F(D)=(1-D^2)(1+p_1 D+p_2 D^2)=(1-D^2)P(D) \tag{14}$$

Let $S(D)=F(D)F(D^{-1})$ be the D-transform of the autocorrelation function of the impulse response associated with the detector target. Then $$S(D)=s_4 D^{-4}+s_3 D^{-3}+s_2 D^{-2}+s_1 D^{-1}+s_0+s_1 D^{1+}s_2 D^{2+}s_3 D^{3+}s_4 D^4 \tag{15}$$

where, $s_1=p_1(p_2+1),$ $s_2=-(1-p_2)^2-p_1^2$ $s_3=-p_1(p_2+1),$ $s^4=-p_2$ \hfill (16)

In this case by applying the time-invariance transformation, the following equivalent matched-filter metric is obtained $$J = -\sum_n(a_n - a_{n+1})Z_n + \sum_n\{s_1 a_n a_{n-1} + (s_2 + s_4)a_n a_{n-2} - \tag{17}$$

$$s_1 a_n a_{n-3} + s_4 a_n a_{n-4} - s_1 a_{n-1} a_{n-2} + s_1 a_{n-2} a_{n-3} -$$

$$s_4 a_{n-2} a_{n-4} + s_4\}$$

Having reference now to the drawings, in FIG. 1, there is shown a generalized partial-response data channel of the preferred embodiment generally designated by the reference character 100. As shown in FIG. 1, a readback signal is applied to a low pass filter 102 and applied to a PR4 equalizer 104. The PR4 equalizer 104 is followed by a whitening/predictor filter $1+p1D+p2D^2$ 106, a partial matched filter $(131\ D^{-1})(1+p1D^{-1}+p2D^{-2})$ 108, and a corresponding 16-state noise-predictive maximum-likelihood (NPML) detector 110. The output of PR4 equalizer 104 is an equalized signal $x_n$. The output of the whitening/predictor filter $1+p1D+p2D^2$ 106 is the whitened output $y_n$. The partial matched-filter $(1-D^{-1})(1+p1D^{-1}+p2D^{-2})$ 108 facilitates the transformation of the trellis according to the metric in equation (17) providing an output $Z_n$. The 16-state NPML detector 110 provides output decisions $a_n$.

Figure 2:
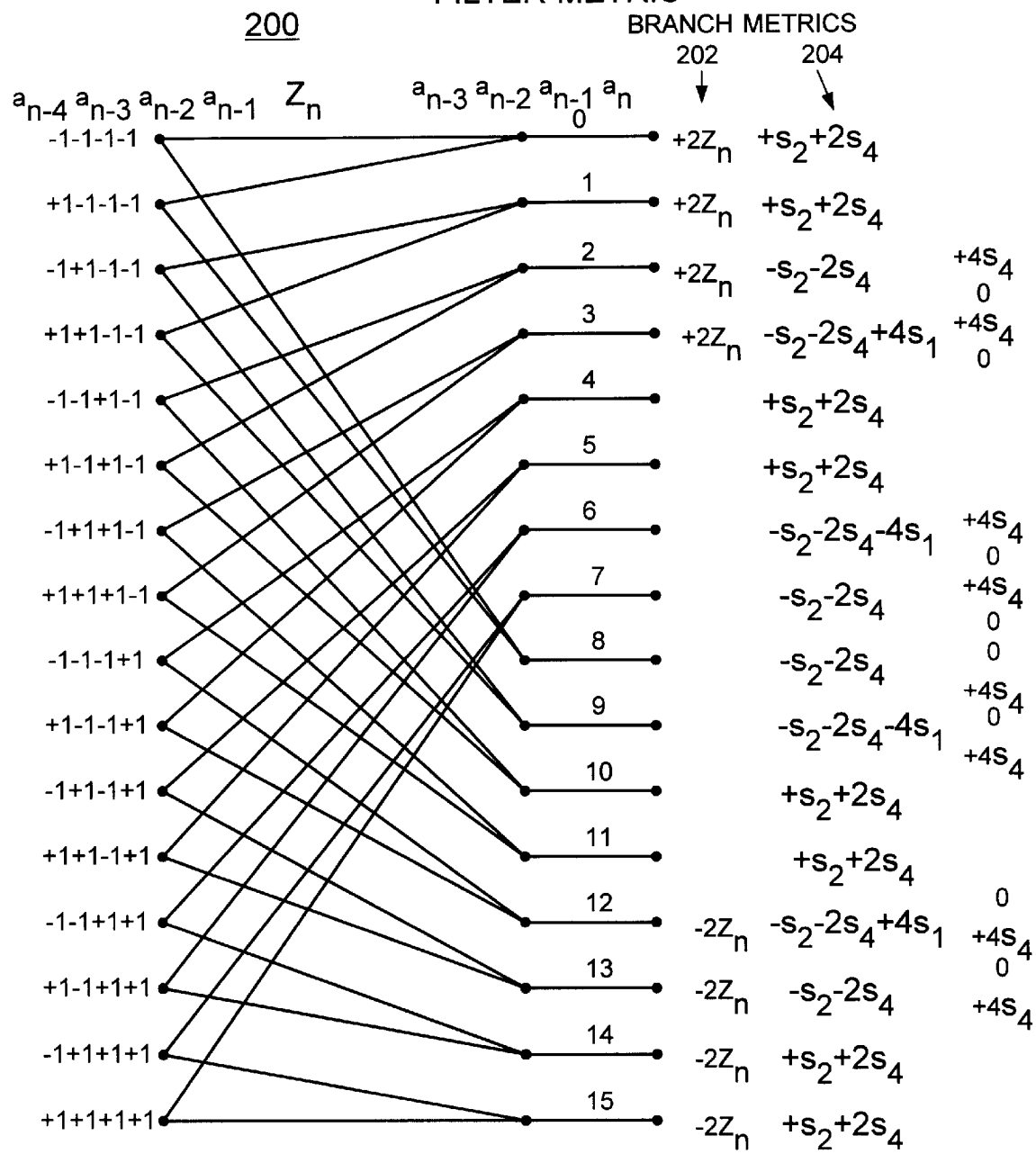
FIG. 2 illustrates a NPML 16-state trellis with partial matched filter metric in accordance with the preferred embodiment.

FIG. 2 illustrates a NPML 16-state trellis with partial matched filter metric in accordance with the preferred embodiment generally designated by the reference character 200. Transitioning through the trellis 200 from time nT represented by the nodes on the left hand side of the trellis to time (n+1)T represented by the nodes on the right hand side of the trellis, Add-Compare-Select (ACS) operations are performed to find the updated state metric. As shown in FIG. 2, NPML 16-state trellis with partial matched filter metric 200 includes 16 nodes or states and 32 branches connecting the 16 states together between time steps. The values $a_{n-4}a_{n-3}a_{n-2}a_{n-1}$ and $a_{n-3}a_{n-2}a_{n-1}a_n$ are the trellis states (0–15) at times nT and (n+1)T, respectively. On the right side of the trellis, branch metric data dependent terms $(+2Z_n, -2Z_n)$ 202 and branch metric constant terms (combinations of $s_1$, $s_2$, $s_4$) 204 are shown. The output $Z_n$ of partial matched-filter $(1-D^{-1})(1+p1D^{-1}+p2D^{-2})$ 108 is shown above the trellis.

Figure 3:
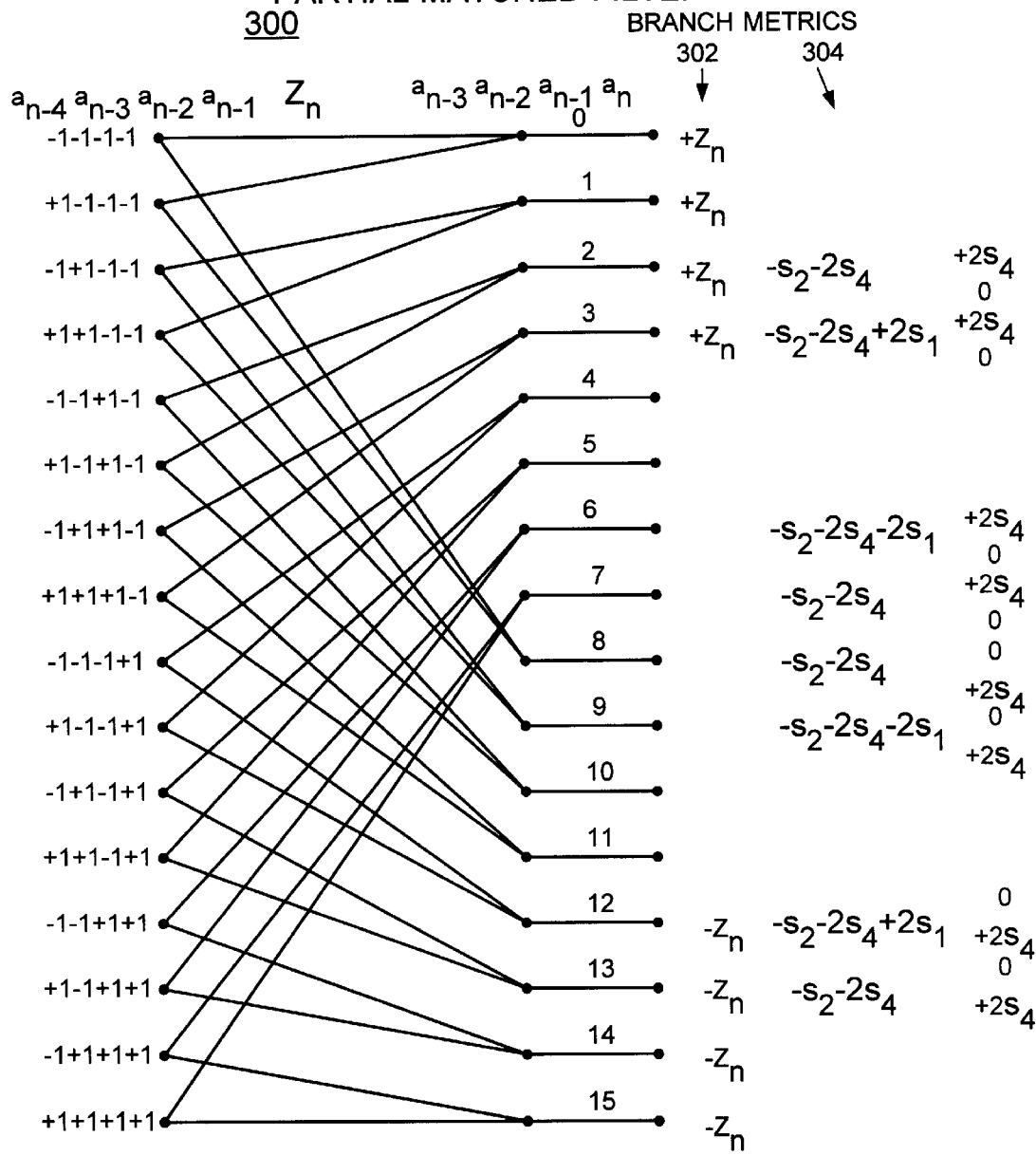
FIG. 3 illustrates a transformed NPML 16-state trellis with partial matched filter metric in accordance with the preferred embodiment.

FIG. 3 illustrates a transformed NPML 16-state trellis with partial matched filter metric in accordance with the preferred embodiment generally designated by the reference character 300. As shown in FIG. 3, the NPML 16-state trellis with partial matched filter metric 200 of FIG. 2 is transformed by subtracting the constant term $s_2+2s_4$ from all the state metrics and normalizing all metric components by a factor of two. The resulting branch metric data dependent terms $(+Z_n, -Z_n)$ 302 and branch metric constant terms (combinations of $s_1$, $s_2$, $s_4$) 304 are shown on the right side of the trellis 300.

Figure 4:
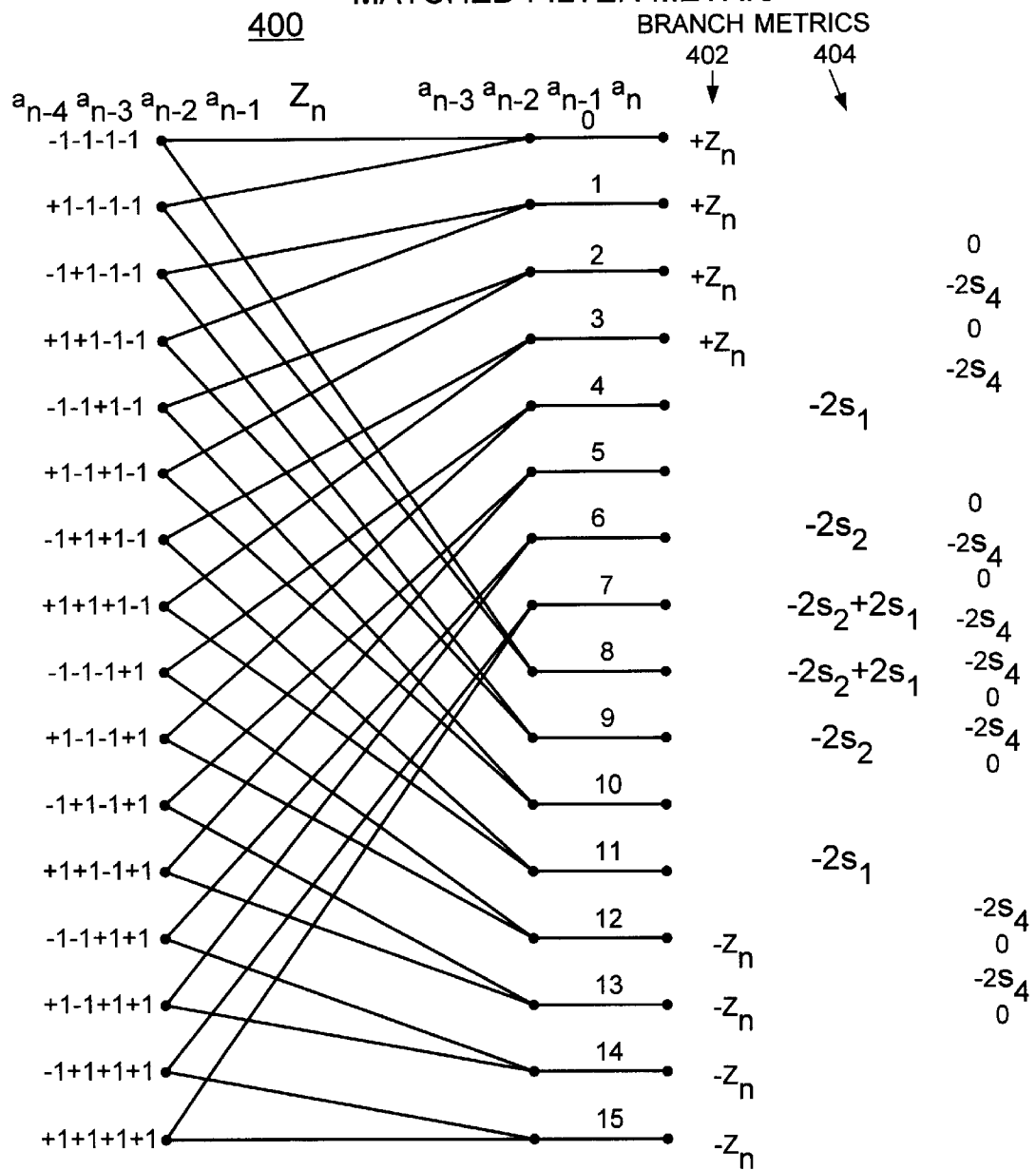
FIG. 4 illustrates an equivalent NPML 16-state trellis with partial matched filter metric in accordance with the preferred embodiment.
Figure 5:
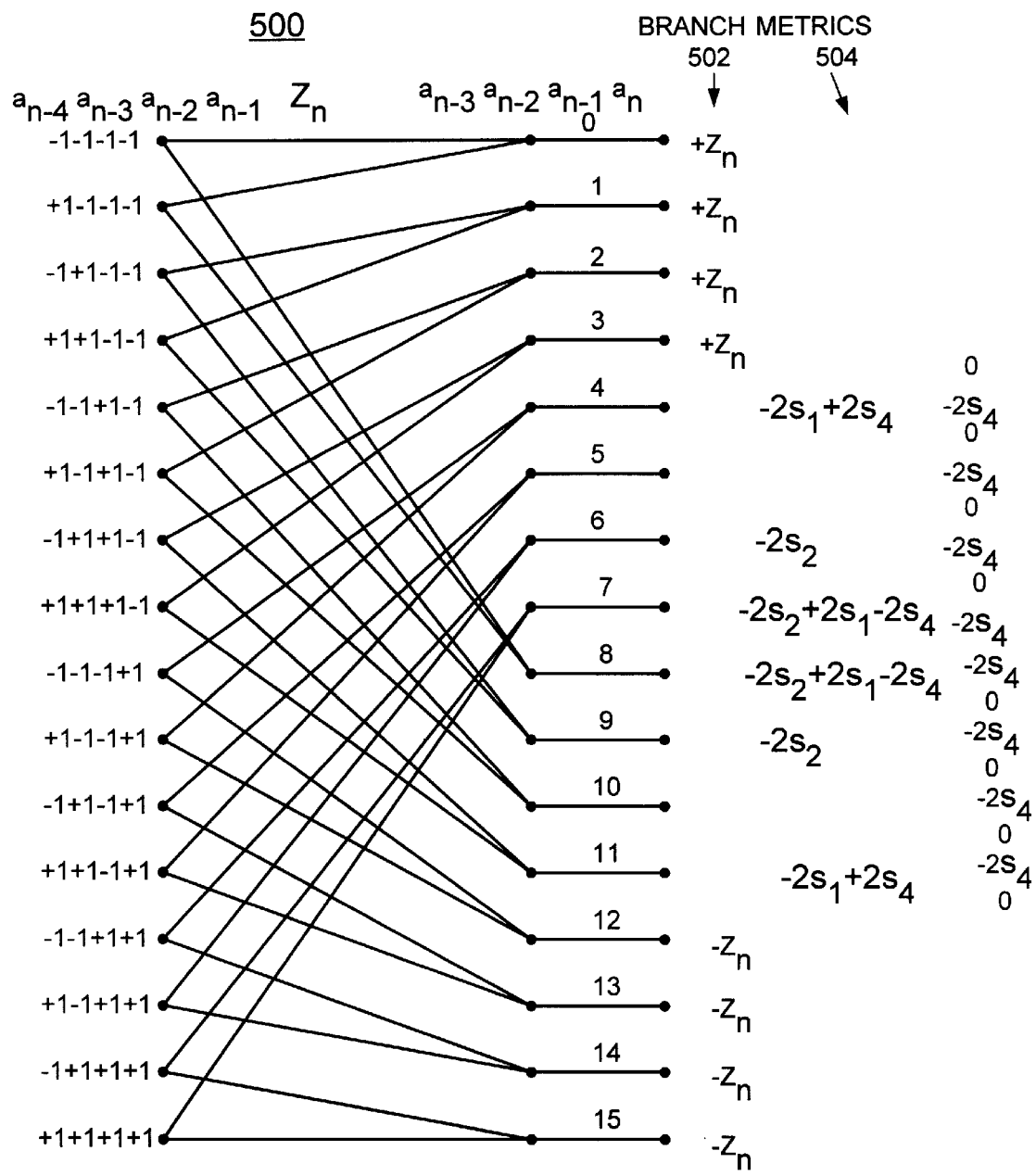
FIG. 5 illustrates another equivalent NPML 16-state trellis with partial matched filter metric in accordance with the preferred embodiment.

Referring to FIGS. 4 and 5, FIG. 4 illustrates an equivalent NPML 16-state trellis with partial matched filter metric in accordance with the preferred embodiment generally designated by the reference character 400. FIG. 4 shows the 16-state trellis 400 where the common data dependent terms and constant terms have been collected at the output of the ACS units by applying the distributive law min(a+x, b+x)= min(a,b)+x. FIG. 5 illustrates another equivalent NPML 16-state trellis with partial matched filter metric in accordance with the preferred embodiment generally designated by the reference character 500. Both trellises 400 and 500 require only 8 branch adders instead of 32 for the branch metric data dependent terms $(+Z_n, -Z_n)$ 302. Furthermore, there are 4 additions with the branch metric data dependent terms $+Z_n$ 402, 502, 4 additions with the branch metric data dependent terms $-Z_n$ 402, 502, and 6 additions with branch metric constant terms 404, 504 following the ACS unit that involve only three constants, $s_1$, $s_2$, $s_4$.

An equivalent metric realization can be obtained by applying a full matched-filter transformation to the metric in equation (4). By applying the time-invariance transformation we obtain the following equivalent matched-filter metric:

$$J = -\sum_n a_n W_n + \sum_n \left( a_n \left( \sum_{i=1}^{4} s_i a_{n-i} \right) \right) \quad (18)$$

Figure 6:
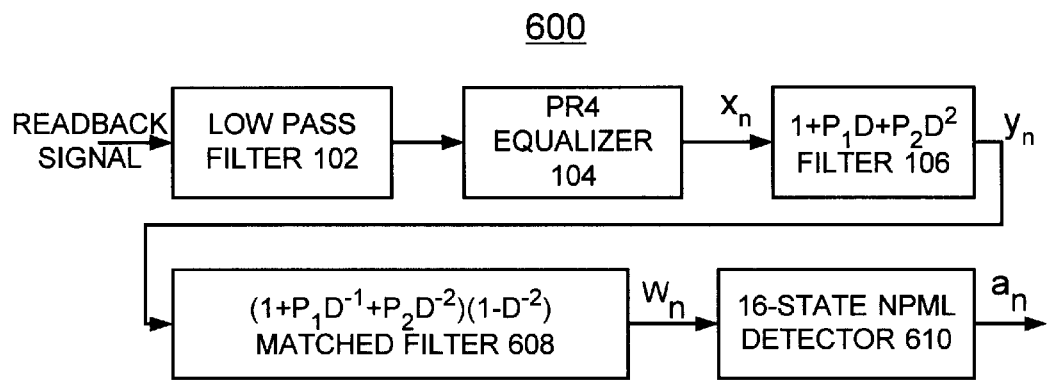
FIG. 6 is a block diagram representation illustrating a generalized partial-response data channel including a NPML 16-state detector for PR4 equalized signals using matched filter metric in accordance with the preferred embodiment.

FIG. 6 is a block diagram representation illustrating a generalized partial-response data channel including a NPML 16-state detector for PR4 equalized signals using matched filter metric in accordance with the preferred embodiment generally designated by the reference character 600. As shown in FIG. 6, a readback signal is applied to a low pass filter 102 and applied to a PR4 equalizer 104. The PR4 equalizer 104 is followed by a whitening/predictor filter $1+p1D+p2D^2$ 106, a matched filter $(1+p1D^{-1}+p2D^{-2})(1-D^{-2})$ 608, and a corresponding 16-state noise-predictive maximum-likelihood (NPML) detector 610. The output of PR4 equalizer 104 is an equalized signal $x_n$. The output of the whitening/predictor filter $1+p1D+p2D^2$ 106 is the whitened output $y_n$. The matched-filter $(1+p1D^{-1}+p2D^{-2})(1-D^{-2})$ 108 facilitates the transformation of the trellis according to the metric in equation (18) providing an output $W_n$. The 16-state NPML detector 610 provides output decisions $a_n$.

Figure 7:
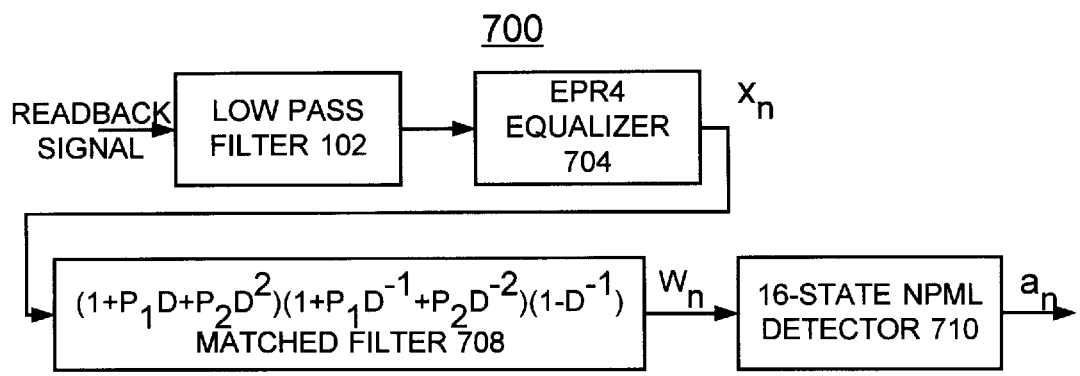
FIG. 7 illustrates a NPML 16-state detector for EPR4 equalized signals using matched filter metric in accordance with the preferred embodiment.

FIG. 7 illustrates a NPML 16-state detector for extended PR4 (EPR4) equalized signals using matched filter metric in accordance with the preferred embodiment generally designated by the reference character 700. As shown in FIG. 7, a readback signal is applied to a low pass filter 102 and applied to an EPR4 equalizer 704. The EPR4 equalizer 704 replaces the PR4 equalizer 104 of FIG. 6. The EPR4 equalizer 704 is followed by a matched filter $(1+p1D+p2D^2)(1+p1D^{-1}+p2D^{-2})(1-D^{-1})$ 708, and a corresponding 16-state noise-predictive maximum-likelihood (NPML) detector 710. The output of EPR4 equalizer 704 is an equalized signal $x_n$. The matched-filter $(1+p1D+p2D^2)(1+p1D^{-1}+p2D^{-2})(1-D^{-1})$ 708 provides an output $W_n$. The 16-state NPML detector 710 provides output decisions $a_n$.

Figure 8:
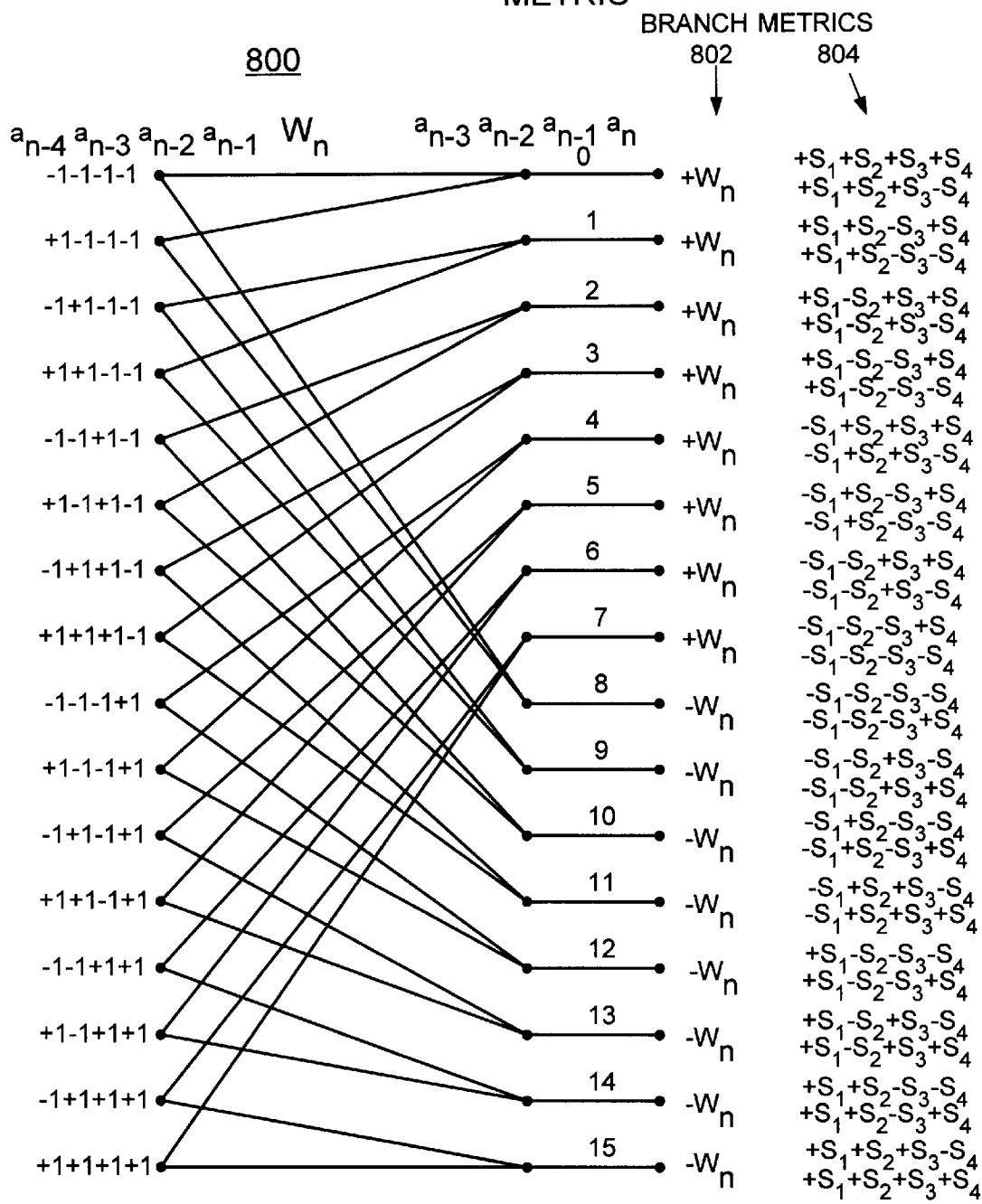
FIG. 8 illustrates a NPML 16-state trellis with matched filter metric in accordance with the preferred embodiment.
Figure 9:
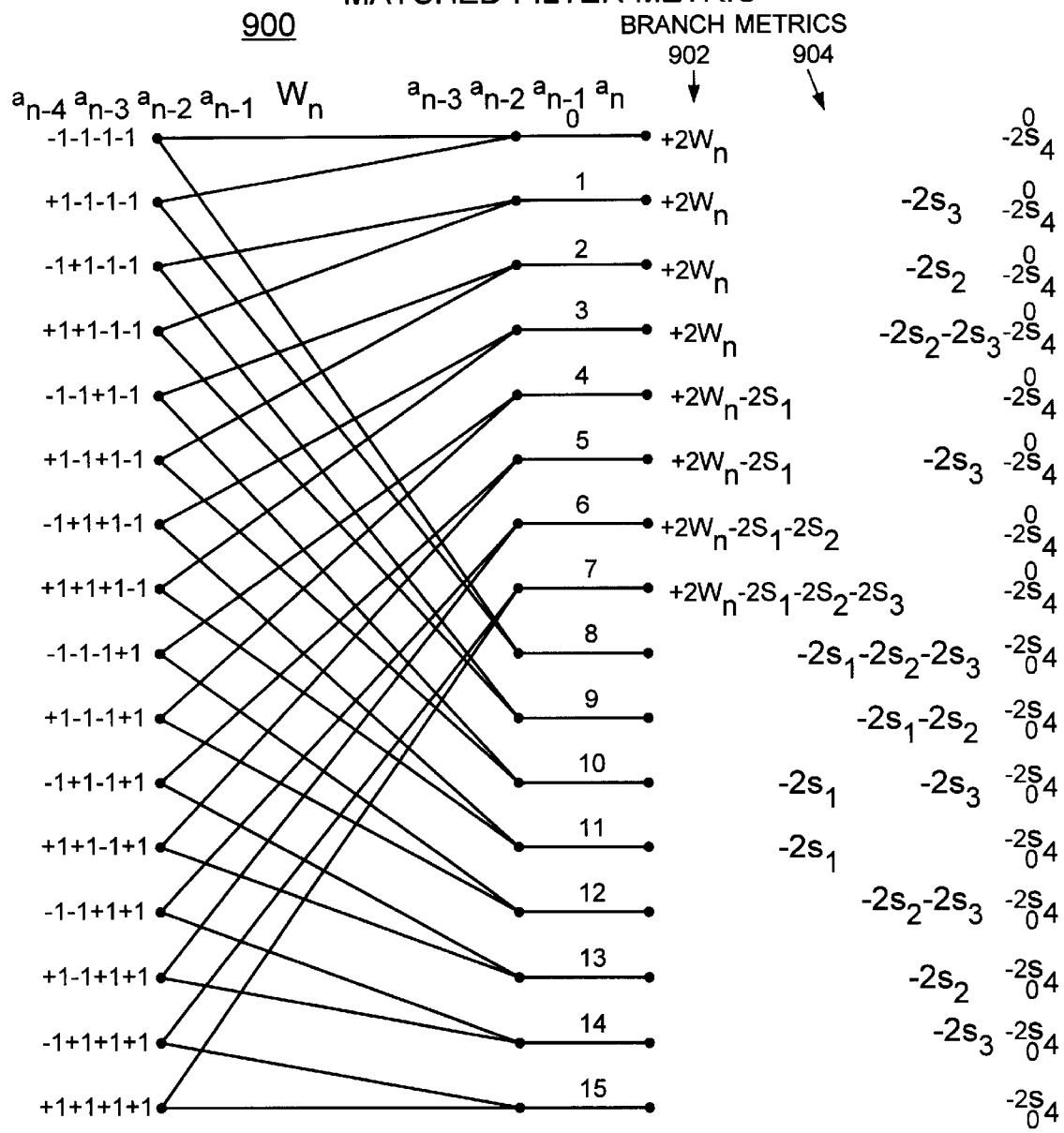
FIG. 9 illustrates a transformed NPML 16-state trellis with matched filter metric in accordance with the preferred embodiment.
Figure 10:
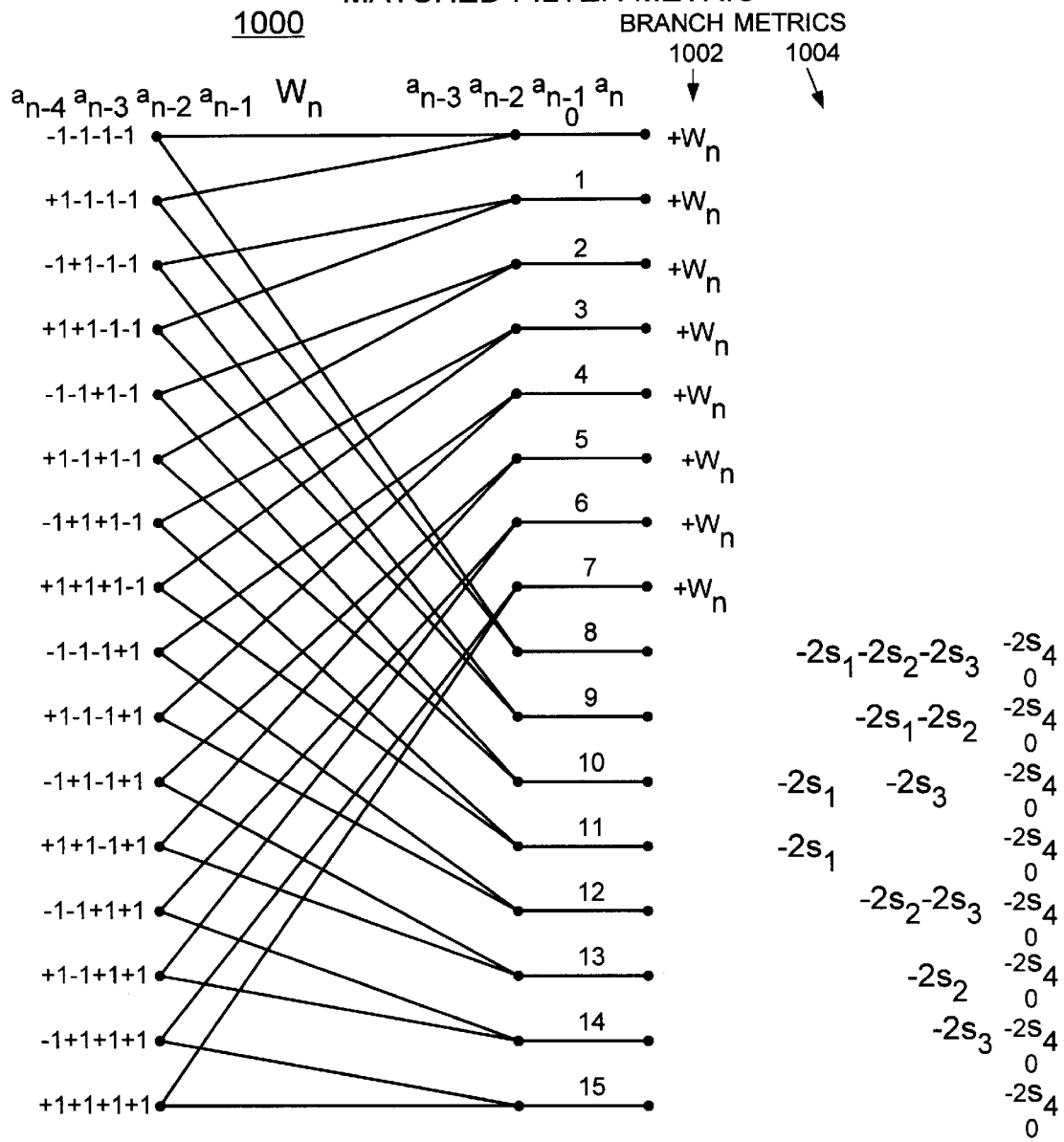
FIG. 10 illustrates an equivalent NPML 16-state trellis with matched filter metric in accordance with the preferred embodiment.

Referring now to FIGS. 8, 9 and 10, FIG. 8 illustrates a NPML 16-state trellis with matched filter metric in accordance with the preferred embodiment generally designated by the reference character 800. On the right side of the trellis 800, branch metric data dependent terms $(+W_n, -W_n)$ 802 and branch metric constant terms (combinations of $s_1$, $s_2$, $s_3$, $s_4$) 804 are shown. FIG. 8 shows the 16-state T-trellis 800 that minimizes the metric in equation (18). FIG. 9 illustrates a transformed NPML 16-state T-trellis with matched filter metric in accordance with the preferred embodiment generally designated by the reference character 900. FIG. 9 shows the trellis in FIG. 8 after adding the term $W_n-s_1-s_2-s_3-s_4$ to all the state metrics. In FIG. 9, the data dependent branch metric term $2W_n$ 902 is associated with states 0–7 and the constant branch metric terms (combinations of $s_1,s_2,s_3,s_4$) 904 are associated with states 0–15. FIG. 10 illustrates an equivalent NPML 16-state T-trellis with matched filter metric and a two-way add/compare/select (ACS) in accordance with the preferred embodiment generally designated by the reference character 1000. FIG. 10 shows the resulting 16-state trellis 1000 after collecting the common data dependent or time-varying and constant terms at the output of the ACS units according to the distributive law min(a+x, b+x)= min(a,b)+x, and normalizing all metric components by a factor of two. In FIG. 10, the data dependent branch metric term $+W_n$ 1002 is associated with states 0–7 and the constant branch metric terms (combinations of $s_1,s_2,s_3,s_4$) 1004 are associated with states 8–15 only. In the trellis of FIG. 10 there are only 8 branch adders instead of 32. There are 8 additions with the data dependent term $+W_n$ 1002 and 6 additions with constant terms (combinations of $s_1,s_2,s_3,s_4$) 1004 following the ACS unit. From equation 16, note that $s_1+s_3$ equals zero.

Consider the time-invariance property for 2T-processing. High data rates may necessitate the processing of multiple samples per trellis branch. In the following, it is described how the concept of time invariance of the state metrics applies to the case of processing two samples per trellis branch. The extension of this concept to processing any number of samples per trellis branch is straight forward. A Viterbi detector operating on two samples at a time, will find the sequence that minimizes the following metric:

$$J = -\sum_n y_n \left( a_{2n} + \sum_{i=1}^{L} f_i a_{2n-i} \right) - \quad (19)$$

$$\sum_n y_{2n+1} \left( a_{2n+1} + \sum_{i=1}^{L} f_i a_{2n+1-i} \right) +$$

$$\sum_n \left( \sum_{i=1}^{L} f_i a_{2n} a_{2n-i} + \sum_{i=1}^{L-1} \sum_{j>i}^{L} f_i f_j a_{2n-i} a_{2n-j} \right) +$$

$$\sum_n \left( \sum_{i=1}^{L} f_i a_{2n+1} a_{2n+1-i} + \sum_{i=1}^{L-1} \sum_{j>i}^{L} f_i f_j a_{2n+1-i} a_{2n+1-j} \right)$$

Observe that:

$$\sum_{n=0}^{\infty} y_n a_{2n-2j-i} = \sum_{n=-j}^{\infty} y_{2n+2j} a_{2n-i} = \sum_{n=0}^{\infty} y_{2n+2j} a_{2n-i} \quad (20)$$

Similarly:

$$\sum_{n=0}^{\infty} y_{2n+1} a_{2n-2j-i} = \sum_{n=-j}^{\infty} y_{2n+2j+1} a_{2n-i} = \sum_{n=0}^{\infty} y_{2n+2j+1} a_{2n-i} \quad (21)$$

where i=0,1. Thus, the time-invariance property now holds on a two-step basis for both the odd and even sequence of channel output samples. In general, when processing m samples per trellis branch the time-invariance property holds on an m-step basis.

The preferred embodiments for 2T-processing may be understood as follows. The EPR4 detector target is given by, $F(D)=(1-D^2)(1+D)=(1+D-D^2-D^3)$. This target gives rise to an 8-state trellis. A Viterbi detector operating on two samples, $y_{2n}$, $y_{2n+1}$ at a time, will find the sequence $\{\hat{a}_n\}$ that according to equation (19) minimizes the following metric:

$$J = -\sum_n \{y_{2n}(a_{2n} + a_{2n-1} - a_{2n-2} - a_{2n-3}) + \quad (22)$$

$$y_{2n+1}(a_{2n+1} + a_{2n} - a_{2n-1} - a_{2n-2})\} +$$

$$\sum_n (-2a_{2n}a_{2n-2} - a_{2n}a_{2n-3} - a_{2n-1}a_{2n-3} + a_{2n-2}a_{2n-3} +$$

$$a_{2n+1}a_{2n} - a_{2n+1}a_{2n-1} - a_{2n+1}a_{2n-2})$$

As can be seen the first summation term in equation (22) depends on the channel samples and has been termed the data dependent or time-varying component of the branch metric. The second summation term depends only on data symbols and has been termed the constant component of the branch metric. Applying the time-invariance equation to the first summation term in equation (22) we obtain:

$$-\sum_n \{y_{2n}(a_{2n} + a_{2n-1} - a_{2n-2} - a_{2n-3}) + \quad (23)$$

$$y_{2n+1}(a_{2n+1} + a_{2n} - a_{2n-1} - a_{2n-2})\} =$$

$$-\sum_n \{(a_{2n} + a_{2n-1})Z_{2n} + (a_{2n+1} + a_{2n})Z_{2n+1}\}$$

where $Z_n = y_n - y_{n+2}$ can be interpreted as the output of a partial matched-filter with a response matched to $1-D^2$.

As described above, there are only a finite number of possible sets of branch constants for the transition defined by the window of symbols $a_{2n-3}, \ldots, a_{2n+1}$ which can be exhaustively found by computer search exploiting the time-invariance property in equations (20) and (21). It can readily be seen that there are only 16 sets of constants. Out of the 16 possible sets of constants the one leading to the set with the maximum number of zeros corresponds to the RHS of the following equation $$\sum_n (-2a_{2n}a_{2n-2} - a_{2n}a_{2n-3} - a_{2n-1}a_{2n-3} + \quad (24)$$

$$a_{2n-2}a_{2n-3} + a_{2n+1}a_{2n} - a_{2n+1}a_{2n-1} - a_{2n+1}a_{2n-2}) =$$

$$\sum_n (-2a_{2n}a_{2n-2} - a_{2n}a_{2n-3} - 2a_{2n+1}a_{2n-1} +$$

$$a_{2n-2}a_{2n-3} + a_{2n+1}a_{2n} - a_{2n+1}a_{2n-2})$$

Combining the data dependent and constant terms in equations (23) and (24), respectively, we obtain the following equivalent partial matched-filter metric for EPR4 detectors processing two samples per trellis branch:

$$J = -\sum_n \{(a_{2n} + a_{2n-1})Z_{2n} + (a_{2n+1} + a_{2n})Z_{2n+1}\} + \quad (25)$$

$$\sum_n (-2a_{2n}a_{2n-2} - a_{2n}a_{2n-3} - 2a_{2n+1}a_{2n-1} +$$

$$a_{2n-2}a_{2n-3} + a_{2n+1}a_{2n} - a_{2n+1}a_{2n-2})$$

Figure 11:
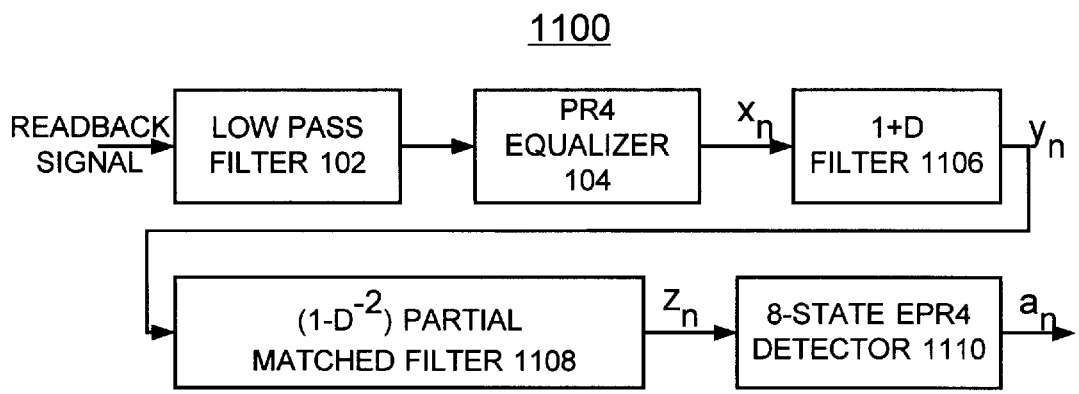
FIG. 11 illustrates is a block diagram representation illustrating a generalized partial-response data channel including a EPR4 detector for PR4 equalized signals using matched filter metric in accordance with the preferred embodiment.

Referring now to FIGS. 11, 12, 13, and 14, FIG. 11 shows a block diagram representation illustrating a generalized partial-response data channel including a EPR4 detector for PR4 equalized signals using matched filter metric in accordance with the preferred embodiment generally designated by the reference character 1100. As shown in FIG. 11, a readback signal is applied to a low pass filter 102 and applied to a PR4 equalizer 104. The PR4 equalizer 104 is followed by an EPR4 shaping filter 1+D 1106, a partial matched filter $1-D^{-2}$ 1108, and a corresponding 8-state EPR4 detector 1110. The output of PR4 equalizer 104 is an equalized signal $x_n$. The output of the EPR4 shaping filter 1+D 1106 is the output $y_n$. The partial matched filter $1-D^{-2}$ 1108 provides an output $Z_n$. The 8-state EPR4 detector 1110 provides output decisions $a_n$. The EPR4 shaping filter 1+D 1106 facilitates the transformation of the trellis according to the metric in equation (25).

Figure 12:
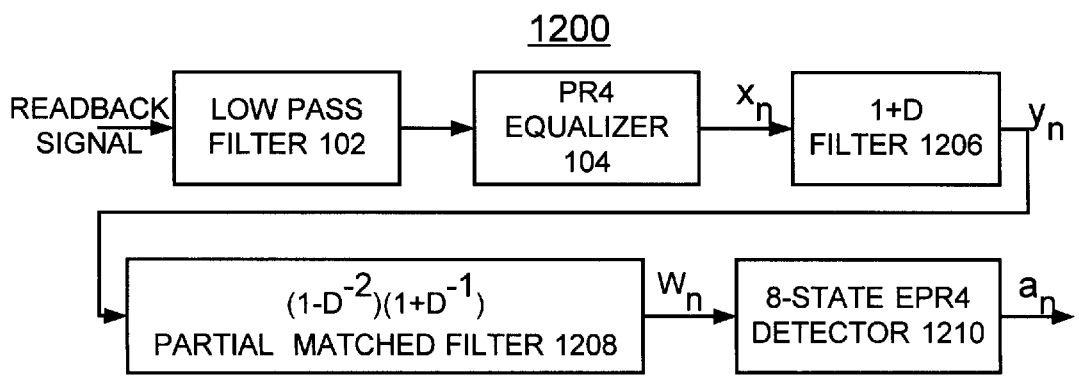
FIG. 12 illustrates is a block diagram representation illustrating a generalized partial-response data channel including an EPR4 detector for PR4 equalized signals using matched filter metric in accordance with the preferred embodiment.

FIG. 12 shows a block diagram representation illustrating a generalized partial-response data channel including an EPR4 detector for EPR4 equalized signals using partial matched filter metric in accordance with the preferred embodiment generally designated by the reference character 1200. As shown in FIG. 12, the low pass filter 102 and the PR4 equalizer 104 is followed by an EPR4 shaping filter 1+D 1206, a partial matched filter $(1-D^{-2})(1-D^{-1})$ 1208, and a corresponding 8-state EPR4 detector 1210. The output of PR4 equalizer 104 is an equalized signal $x_n$. The output of the EPR4 shaping filter 1+D 1106 is the output $y_n$. The partial matched filter $(1-D^{-2})(1-D^{-1})$ 1208 provides an output $W_n$. The 8-state EPR4 detector 1210 provides output decisions $a_n$.

Figure 13:
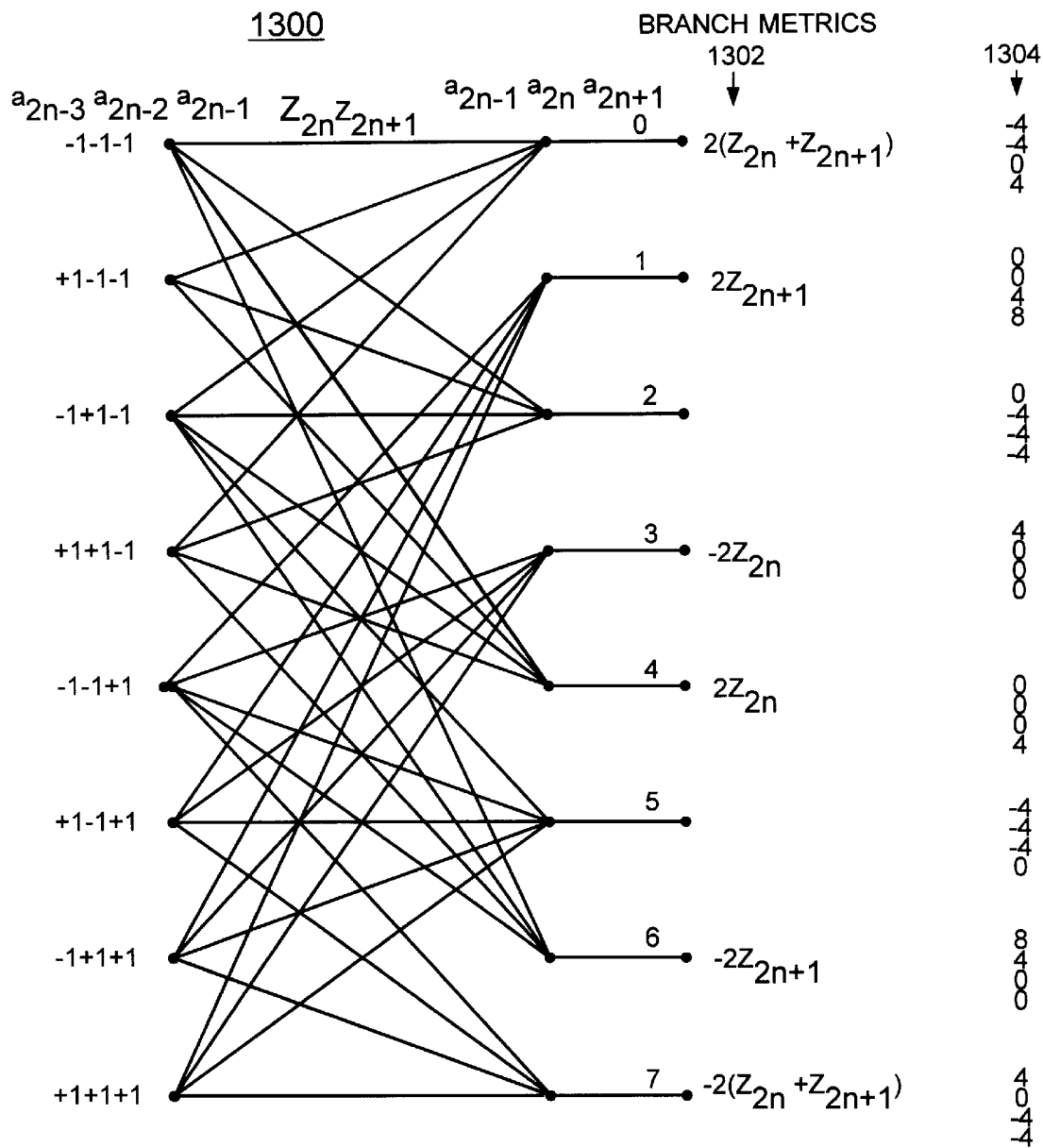
FIG. 13 illustrates an EPR4 2T trellis with partial matched filter metric in accordance with the preferred embodiment.

FIG. 13 illustrates an EPR4 2T trellis with partial matched filter metric in accordance with the preferred embodiment generally designated by the reference character 1300 including data dependent branch metrics 1302 and constant branch metrics 1304. FIG. 13 shows the 8-state trellis 1300 that minimizes the metric in equation (25) where the common data dependent or time-varying terms 1302 have been collected at the output of the ACS units according to the distributive law min(a+x, b+x)=min(a,b)+x.

Figure 14:
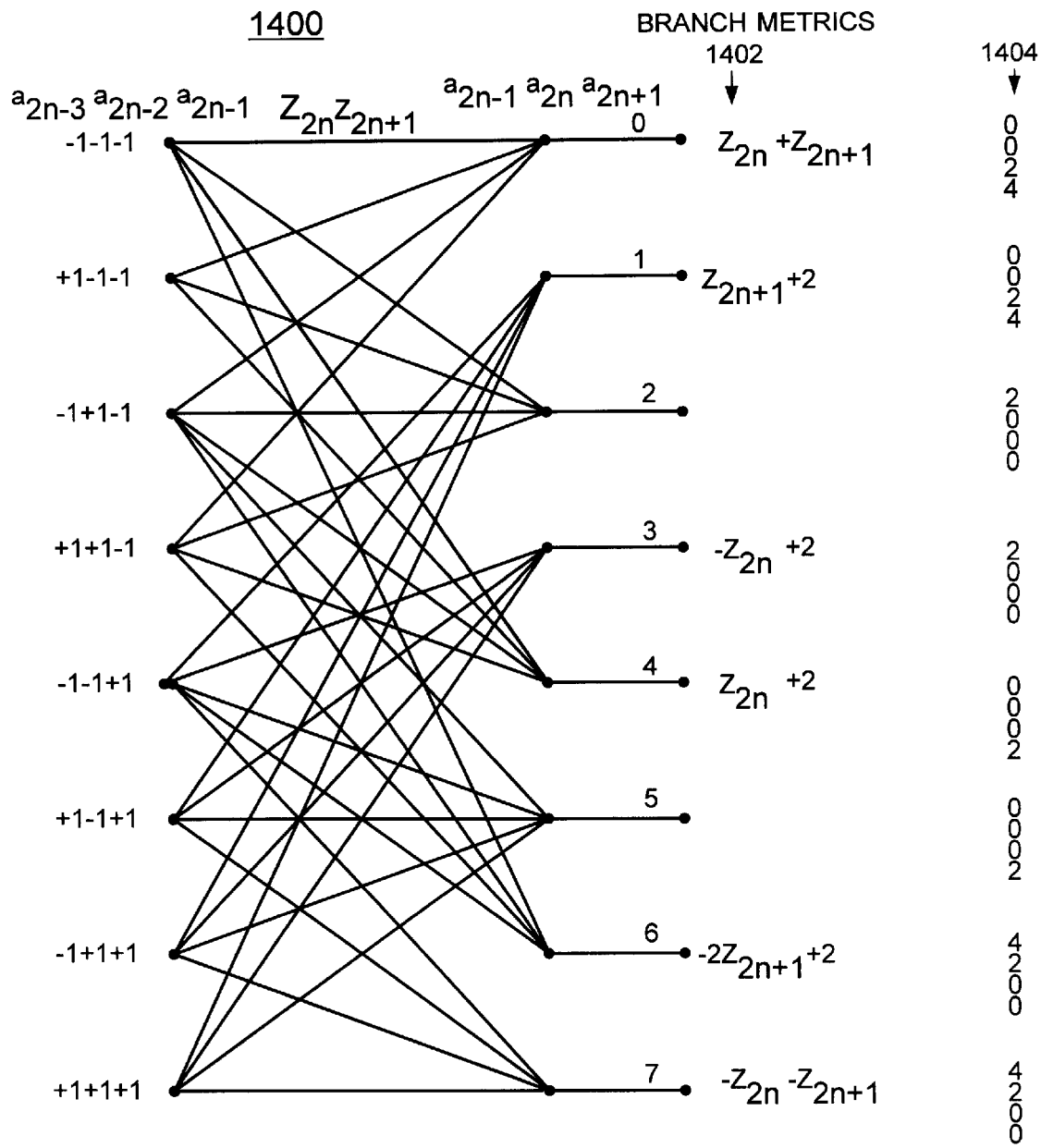
FIG. 14 illustrates an equivalent EPR4 2T trellis with partial matched filter metric in accordance with the preferred embodiment.

FIG. 14 illustrates an equivalent EPR4 2T trellis with partial matched filter metric in accordance with the preferred embodiment generally designated by the reference character 1400 including data dependent branch metrics 1402 and constant branch metrics 1404. FIG. 14 shows the final 8-state transformed trellis after also collecting common constant terms at the output of the ACS units and normalizing all metric components 1402, 1404 by a factor of two. Similarly, it can be seen, by applying the time invariance transformation, that an equivalent representation of the first summation term in equation (22) is also:

$$-\sum_n \{y_{2n}(a_{2n} + a_{2n-1} - a_{2n-2} - a_{2n-3}) + \qquad (26)$$
$$y_{2n+1}(a_{2n+1} + a_{2n} - a_{2n-1} - a_{2n-2})\} =$$
$$-\sum_n \{a_{2n}W_{2n} + a_{2n+1}W_{2n+1}\}$$

where $W_n = y_n + y_{n+1} - y_{n+2} - y_{n+3}$ can be interpreted as the output of a matched-filter with a response matched to $(1-D^2)(1+D)$. In this case the metric becomes:

$$J = -\sum_n \{a_{2n}W_{2n} + a_{2n+1}W_{2n+1}\} + \qquad (27)$$
$$\sum_n (-2a_{2n}a_{2n-2} - a_{2n}a_{2n-3} - 2a_{2n+1}a_{2n-1} +$$
$$a_{2n-2}a_{2n-3} + a_{2n+1}a_{2n} - a_{2n+1}a_{2n-2})$$

Figure 15:
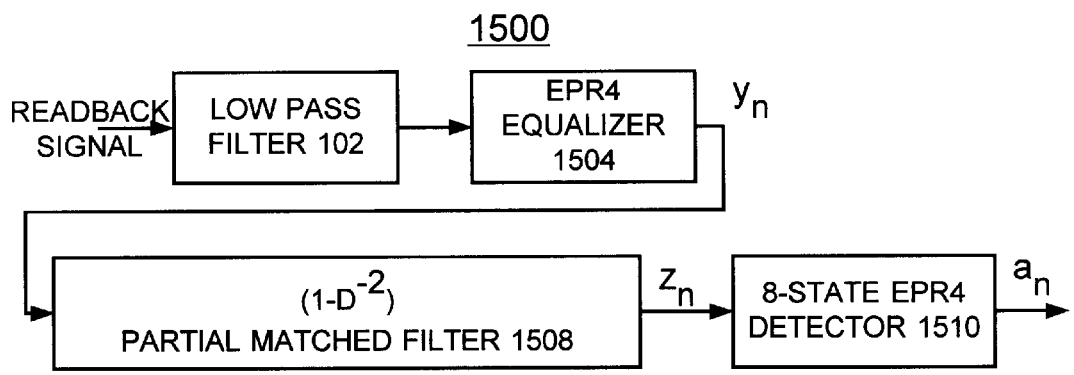
FIG. 15 illustrates is a block diagram representation illustrating a generalized partial-response data channel including an EPR4 detector for EPR4 equalized signals using partial matched filter metric in accordance with the preferred embodiment.

FIG. 15 shows a block diagram representation illustrating a generalized partial-response data channel including an EPR4 detector for EPR4 equalized signals using partial matched filter metric in accordance with the preferred embodiment generally designated by the reference character 1500. As shown in FIG. 15, generalized partial-response data channel 1500 includes the low pass filter 102 and an extended partial response class 4 (EPR4) equalizer 1504 followed by a partial matched filter $(1-D^{-2})$ 1508, and a corresponding 8-state EPR4 detector 1510. The output of EPR4 equalizer 1504 is an equalized signal output $y_n$. The partial matched filter $(1-D^{-2})$ 1508 provides an output $Z_n$. The 8-state EPR4 detector 1510 provides output decisions $a_n$.

Figure 16:
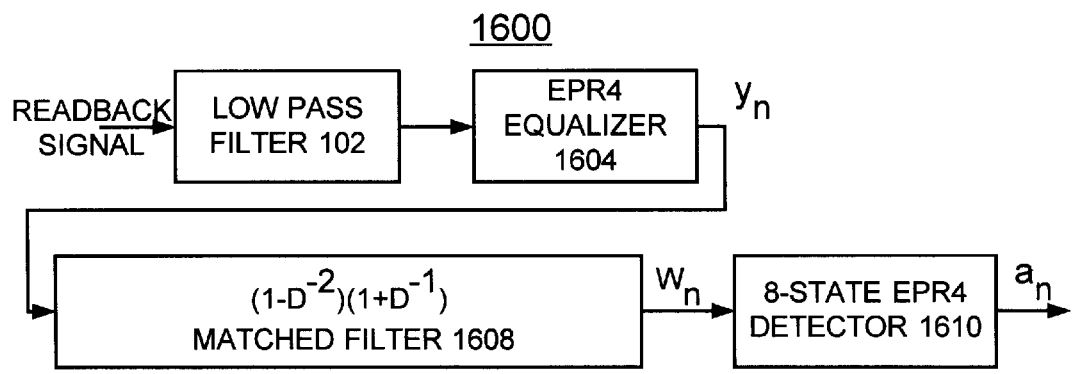
FIG. 16 illustrates is a block diagram representation illustrating a generalized partial-response data channel including an EPR4 detector for EPR4 equalized signals using matched filter metric in accordance with the preferred embodiment.

FIG. 16 shows a block diagram representation illustrating a generalized partial-response data channel including an EPR4 detector for EPR4 equalized signals using matched filter metric in accordance with the preferred embodiment generally designated by the reference character 1600. As shown in FIG. 16, generalized partial-response data channel 1600 includes the low pass filter 102 and an extended partial response class 4 (EPR4) equalizer 1604 followed by a matched filter $(1-D^{-2})(1-D^{-1})$ 1608, and a corresponding 8-state EPR4 detector 1610. The output of EPR4 equalizer 1604 is an equalized signal output $y_n$. The matched filter $(1-D^{-2})(1-D^{-1})$ 1608 provides an output $W_n$. The 8-state EPR4 detector 1610 provides output decisions $a_n$. The matched filter $(1-D^{-2})(1-D^{-1})$ 1608 facilitates the transformation of the trellis according to the metric in equation (27). FIG. 16 includes the same detector as in FIG. 15.

Figure 17:
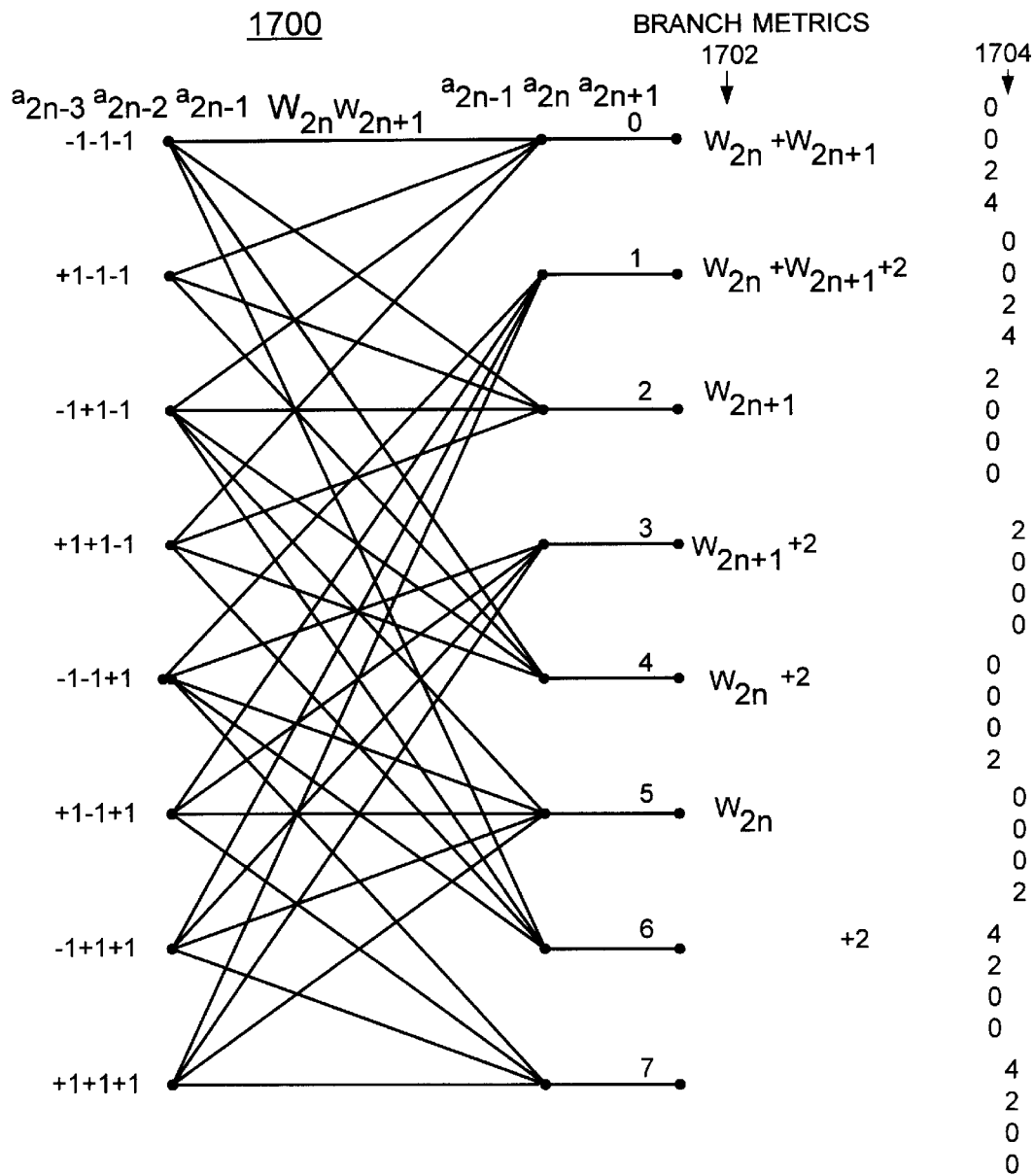
FIG. 17 illustrates an EPR4 2T trellis with matched filter metric in accordance with the preferred embodiment.

FIG. 17 illustrates an EPR4 8-state 2T trellis with matched filter metric in accordance with the preferred embodiment generally designated by the reference character 1700 including data dependent branch metrics 1702 and constant branch metrics 1704. FIG. 17 shows the 8-state transformed trellis 1700 with two samples per branch that minimizes the equivalent metric of equation (27). Note that in all cases the data dependent terms 1702 of the branch metrics are added at the output of the ACS units and that there are only 12 non-zero branch constants out of the maximum 32 possible ones.

The NPML 16-state detector target with two predictor coefficients is given in equation (14). A Viterbi detector operating on two samples, $y_{2n}$, $y_{2n+1}$, at a time, will find the sequence $\{â_n\}$ that minimizes the metric in equation (19). As previously described, the first summation term in equation (19) depends on the channel samples and represents the time-varying or data dependent component of the branch metric. The second summation term depends only on data symbols and represents the constant component of the branch metric. Applying the time-invariance transformation we obtain the following equivalent matched-filter metric:

$$J = -\sum_n \{(a_{2n} + a_{2n-1})Z_{2n} + (a_{2n+1} + a_{2n})Z_{2n+1}\} + \qquad (28)$$
$$\sum_n (s_1 a_{2n} a_{2n-1} + s_2 a_{2n} a_{2n-2} + s_3 a_{2n} a_{2n-3} + s_4 a_{2n} a_{2n-4} +$$
$$s_1 a_{2n-1} a_{2n-2} + s_2 a_{2n+1} a_{2n-1} + s_3 a_{2n-1} a_{2n-4} + s_4 a_{2n+1} a_{2n-3}\}$$

where $Z_{2n}$ can be interpreted as the output of a partial matched-filter with a response matched to P(D)(1-D).

Figure 18:
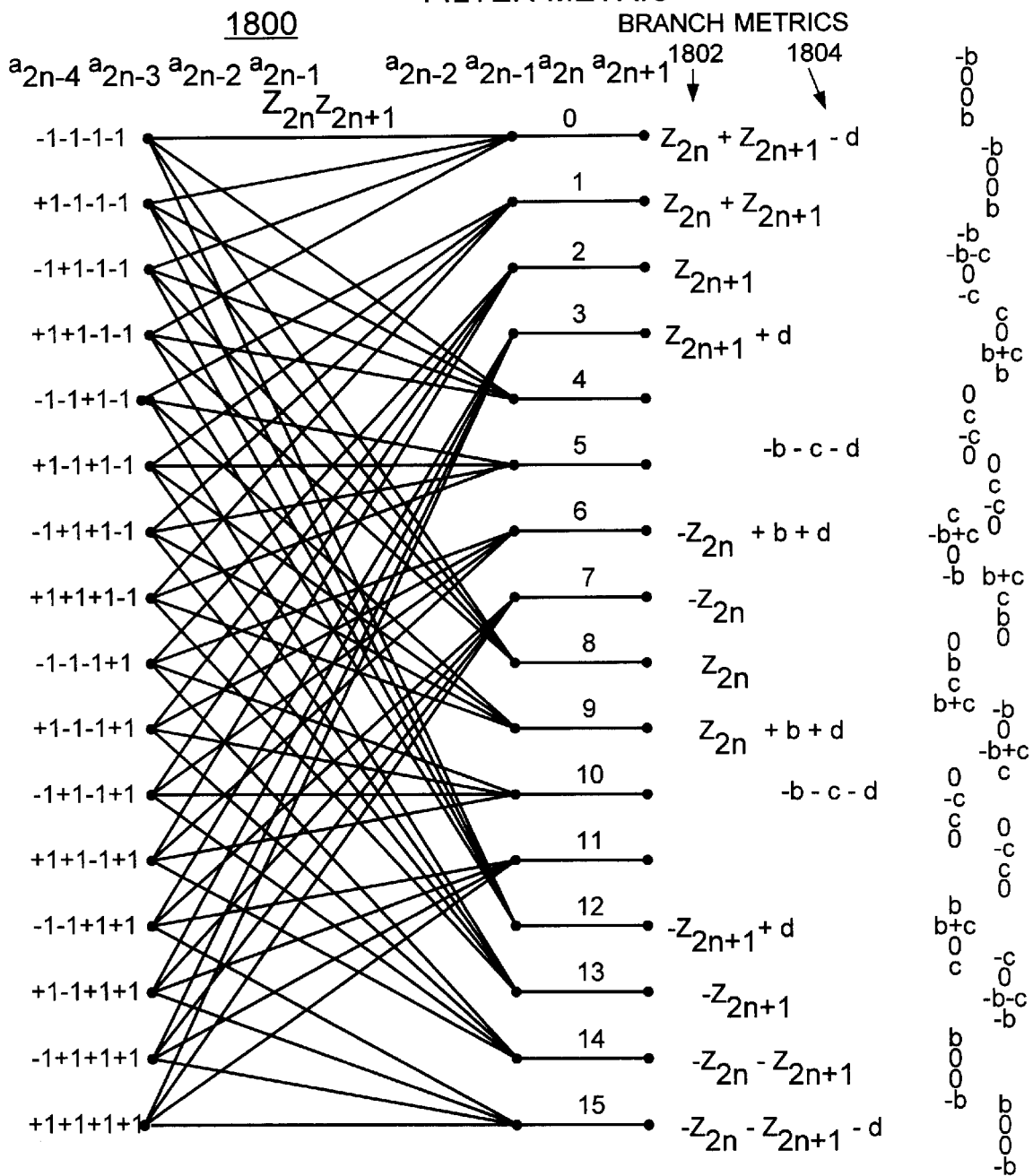
FIG. 18 illustrates a NPML 16-state 2T trellis with partial matched filter metric in accordance with the preferred embodiment.

Referring to FIGS. 1, 2, and 18, FIG. 18 illustrates a NPML 16-state 2T trellis with partial matched filter metric in accordance with the preferred embodiment generally designated by the reference character 1800 including data dependent branch metrics 1802 and constant branch metrics 1804. FIG. 1 shows the block diagram of a PR4 equalizer 104 followed by whitening/predictor filter $1+p1D+p2D^2$ 106, partial matched filter $(1-D^{-1})(1+p1D^{-1}+p2D^{-2})$ 108, and the corresponding 16-state noise-predictive maximum-likelihood (NPML) detector 110. The partial matched-filter $(1-D^{-1})(1+p1D^{-1}+p2D^{-2})$ facilitates the transformation of the trellis according to the metric in equation (28). FIG. 18 shows the particular 16-state trellis 1800 that minimizes the metric in equation (28) after constant terms 1804 have been collected at the output of the ACS units by applying the distributive law min(a+x,b+x)=min(a,b)+x and adding $Z_{2n}$+ $Z_{2n+1}$ to all the state metrics and normalizing all metric components by a factor of two. In FIG. 2 the constants b, c, d are given by $$b = s_1 - s_4$$
$$c = s_1 + s_4$$
$$d = -s_1 - s_2 \qquad (29)$$

In FIG. 18, the trellis 1800 requires only 40 branch adders instead of 64. Furthermore, there are 12 additions with data dependent or time-varying terms, 1802 and 8 additions with constant terms 1804 following the ACS unit. An equivalent metric realization can be obtained by applying a full matched-filter transformation to the metric in equation (28). By applying the time-invariance transformation the following equivalent matched-filter metric is obtained:

$$J = -\sum_n \{a_{2n}W_{2n} + a_{2n+1}W_{2n+1}\} + \qquad (30)$$

$$\sum_n (s_1 a_{2n} a_{2n-1} + s_2 a_{2n} a_{2n-2} + s_3 a_{2n} a_{2n-3} + s_4 a_{2n} a_{2n-4} +$$

$$s_1 a_{2n-1} a_{2n-2} + s_2 a_{2n+1} a_{2n-1} + s_3 a_{2n-1} a_{2n-4} + s_4 a_{2n+1} a_{2n-3}\}$$

Figure 19:
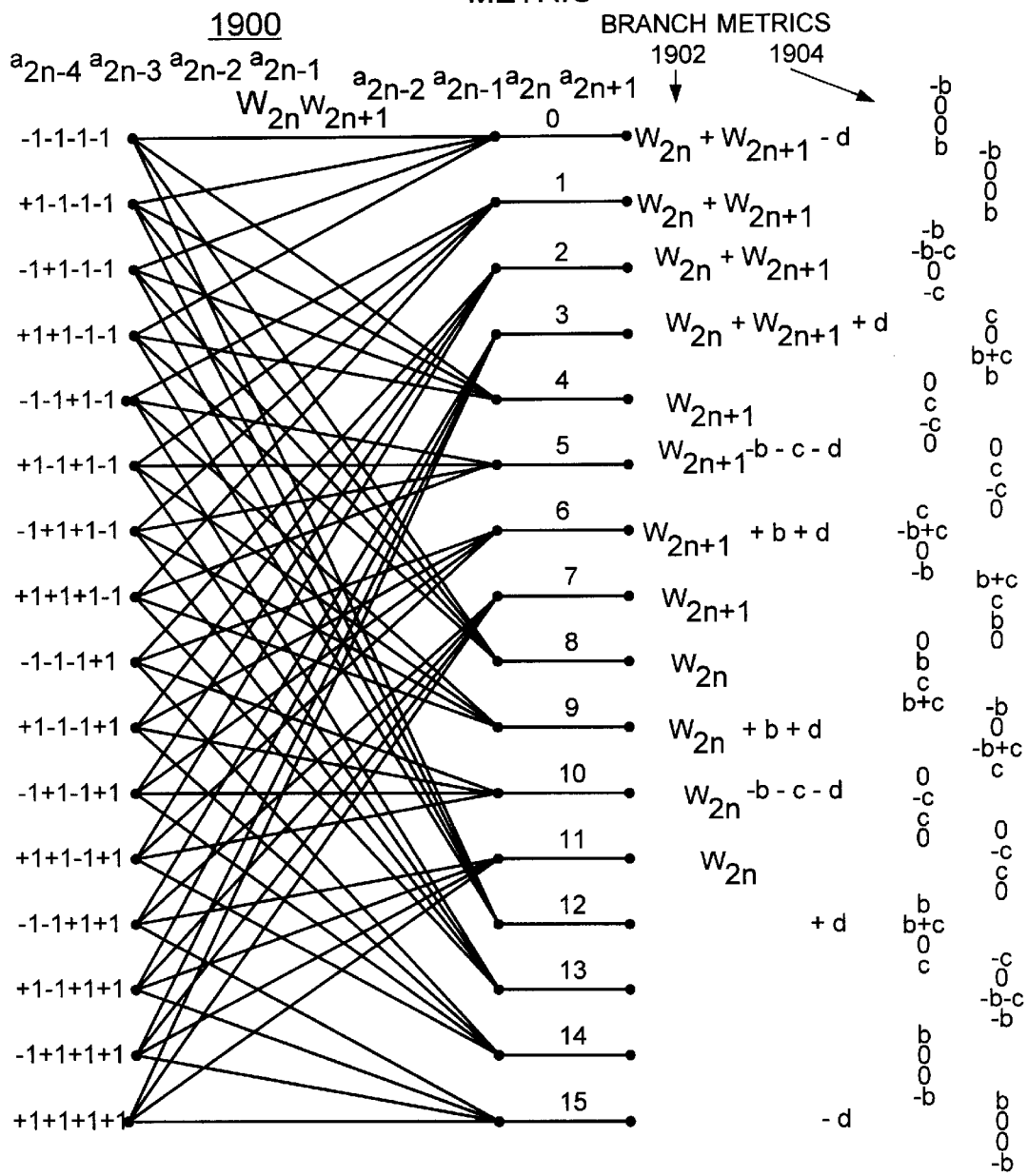
FIG. 19 illustrates a NPML 16-state 2T trellis with matched filter metric in accordance with the preferred embodiment.

Referring to FIGS. 6 and 19, FIG. 19 illustrates a NPML 16-state 2T trellis with matched filter metric in accordance with the preferred embodiment generally designated by the reference character 1900 including data dependent branch metrics 1902 and constant branch metrics 1904. FIG. 6 shows the PR4 equalizer 104 followed by whitening/predictor filter $1+p1D+p2D^2$ 106, matched filter $(1+p1D^{-1} + p2D^{-2})(1-D^{-2})$ 608, and corresponding 16-state noise-predictive maximum-likelihood (NPML) detector 610. The matched filter $(1+p1D^{-1}+p2D^{-2})(1-D^{-2})$ 608 facilitates the transformation of the trellis according to the metric in equation (28). FIG. 19 shows the 16-state trellis 1900 after adding $W_{2n}+W_{2n+1}$ to all the state metrics and normalizing all metric components by a factor of two. The trellis in FIG. 19 again requires only 40 branch adders instead of 64. Furthermore, there are 12 additions with data dependent terms 1902, and 8 additions with constant terms 1904 following the ACS unit.

Figure 20:
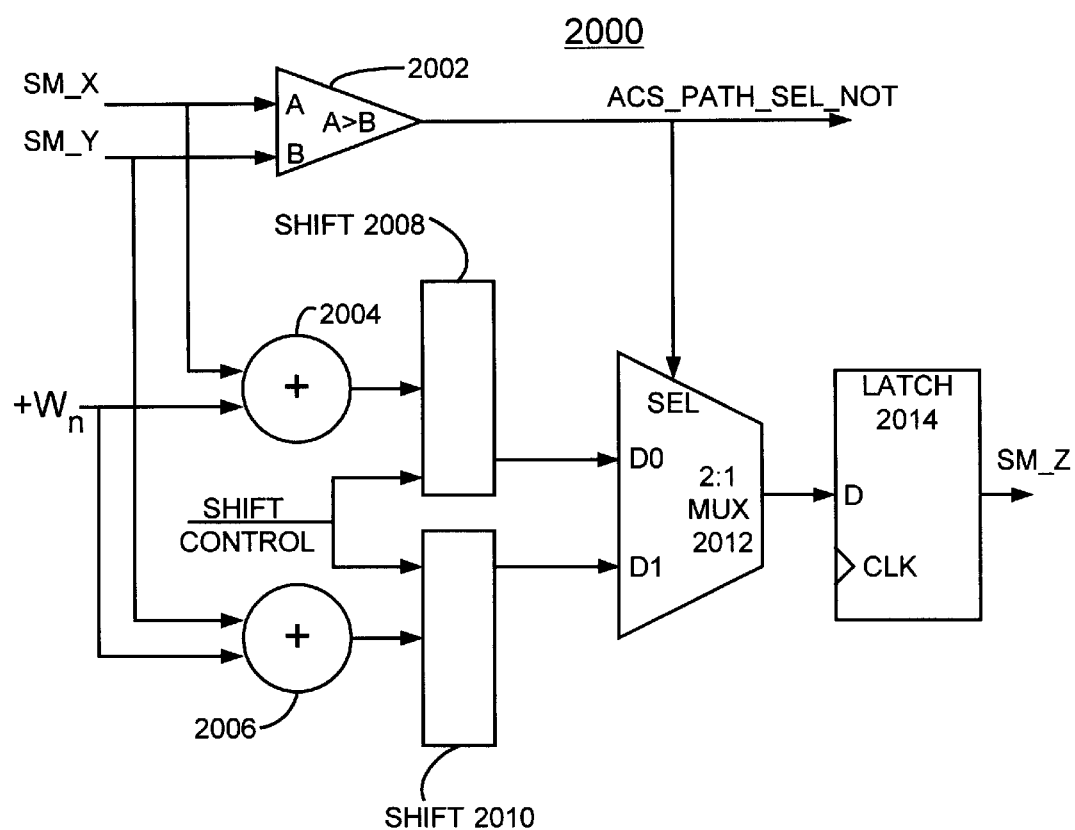
FIGS. 20 and 21 illustrate add compare select (ACS) units in accordance with the preferred embodiment.
Figure 21:
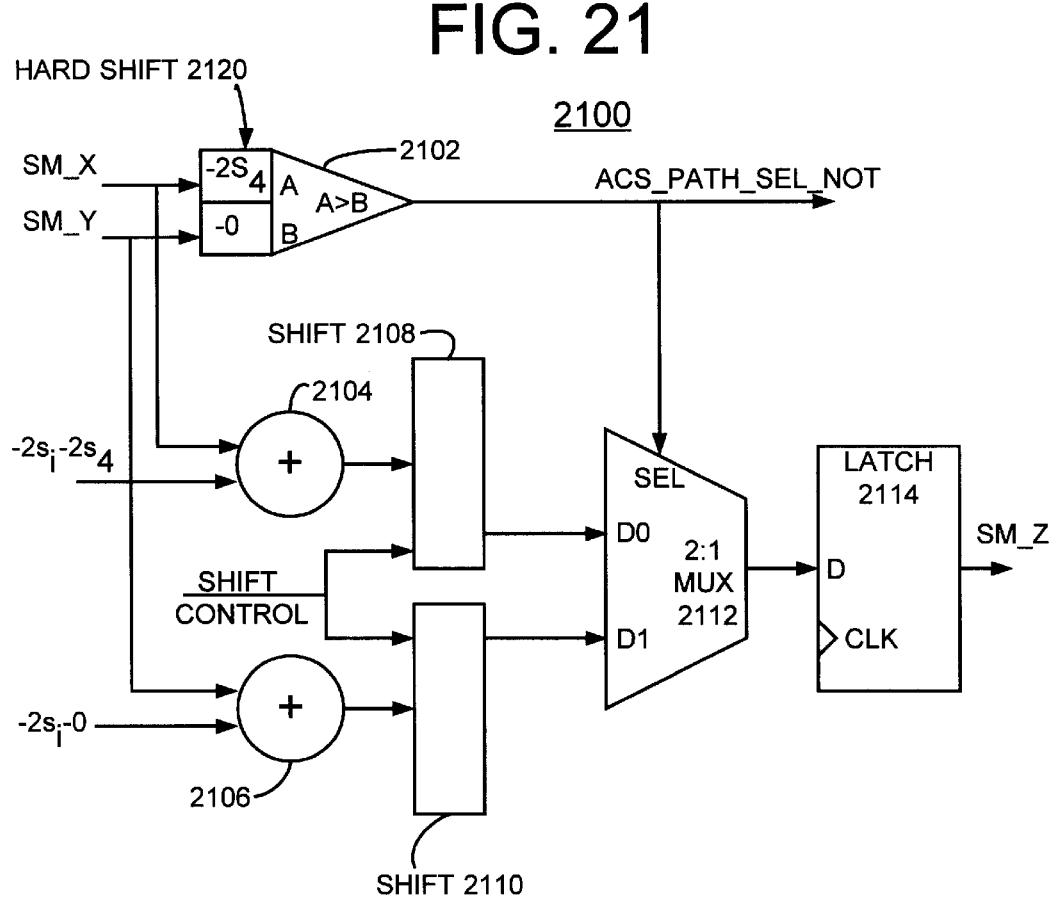

Referring now to FIGS. 20 and 21, there are shown add compare select (ACS) units 2000 and 2100 in accordance with the preferred embodiment. In the conventional Viterbi detector, the add compare select unit in a general form must add three terms and compare then with the sum of three other terms and select the result with minimum distance. In accordance with the preferred embodiment, a method is provided to change the addition of three terms to two terms for the general form and thus a speed advantage is provided. ACS units 2000 and 2100 in accordance with the preferred embodiment also provide add and compare operations in parallel for additional speed advantage.

Referring also to FIG. 10, the ACS unit 2000 in FIG. 20 illustrates a hardware implementation for states 0:7 of FIG. 10. ACS unit 2000 includes a compare 2002 for comparing state metric input values SM_X, SM_Y, a pair of adds 2004 and 2006 for adding the state metric input values SM_X, SM_Y and the data dependent term $W_n$. A pair of shifts 2008 and 2010 couple the output of adds 2004 and 2006 to a 2:1 multiplexer 2012. Shifts 2008 and 2010 receive a shift control input for providing metric bounding to avoid underflow. Shifts 2008 and 2010 shift all state metric values when recentering around zero is required. Multiplexer 2012 select between the two outputs of adds 2004 and 2006 controlled by the output of compare 2002 applied to a select (SEL) input. A latch 2014 connected to the multiplexer 2012 holds the state metric value.

Referring now to FIG. 21, the ACS unit 2100 illustrates a hardware implementation for states 8:15 of FIG. 10. ACS unit 2100 includes a compare 2102 for comparing state metric input values SM_X, SM_Y, a pair of adds 2104 and 2106 for adding the state metric input values SM_X, SM_Y and the constant terms $-s_1,-s_2,-s_3,-s_4$. The compare 2102 includes a hard shift 2120 that is the same for all programmable polynomials and is hard coded. The compare 2102 and hard shift 2120 provides an add for one branch and then a compare between the resultant branches. The compare 2102 and hard shift 2120 operates as fast as the normal compare operation. A pair of shifts 2108 and 2110 couple the output of adds 2104 and 2106 to a 2:1 multiplexer 2112. Shifts 2108 and 2110 receive a shift control input for providing metric bounding to avoid underflow. Shifts 2108 and 2110 shift all state metric values when recentering around zero is required. Multiplexer 2112 select between the two outputs of adds 2104 and 2106 controlled by the output of compare 2102 applied to a select (SEL) input. A latch 2114 connected to the multiplexer 2112 holds the state metric value.

While the present invention has been described with reference to the details of the embodiments of the invention shown in the drawing, these details are not intended to limit the scope of the invention as claimed in the appended claims.

What is claimed is:

1. Apparatus for implementing high-speed and area efficient architectures for Viterbi detection of generalized partial response signals including two-way add/compare/select for improved channel speed comprising:

a two-way compare for comparing first and second state metric input values;

a pair of two-way adds in parallel with said two-way compare for respectively adding said first and second state metric input values with a second input value; said second input value being one of a branch metric data dependent term and a branch metric constant term; and said first and second state metric input values of said two-way compare not including said branch metric data dependent term or said branch metric constant term.

2. Apparatus for implementing high-speed and area efficient architectures for Viterbi detection of generalized partial response signals including two-way add/compare/select for improved channel speed comprising:

a two-way compare for comparing first and second state metric input values;

a pair of two-way adds in parallel with said two-way compare for respectively adding said first and second state metric input values with a second input value; said second input value including a time varying term; and wherein said time varying term is expressed as an output $Z_n$ of a partial matched filter or as an output $W_n$ of a matched filter.

3. Apparatus for implementing high-speed and area efficient architectures for Viterbi detection of generalized partial response signals as recited in claim 2 includes a maximum of $2^{L-1}$ pairs of two-way adds for additions of said time varying terms where a Viterbi detector includes $2^L$ states; where L is a non-zero positive integer value.

4. Apparatus for implementing high-speed and area efficient architectures for Viterbi detection of generalized partial response signals in a Viterbi detector including two-way add/compare/select for improved channel speed comprising:

a two-way compare for comparing first and second state metric input values;

a pair of two-way adds in parallel with said two-way compare for respectively adding said first and second state metric input values with a second input value; said second input value including a constant term; and a maximum of $2^{L-1}$ pairs of two-way adds for additions of said constant terms where the Viterbi detector includes $2^L$ states; where L is a non-zero positive integer value.

5. Apparatus for implementing high-speed and area efficient architectures for Viterbi detection of generalized partial response signals as recited in claim 2 includes a multiplexer coupled to said pair of two-way adds, said multiplexer receiving a selectable input controlled by said two-way compare.

6. Apparatus for implementing high-speed and area efficient architectures for Viterbi detection of generalized partial response signals as recited in claim 2 include a pair of shifts coupled between said pair of two-way adds and said multiplexer, said shifts receiving a shift control input for providing metric bounding to avoid underflow.

7. Apparatus for implementing high-speed and area efficient architectures for Viterbi detection of generalized partial response signals as recited in claim 2 wherein said compare includes a hard shift for providing an add for said first state metric input value and then a compare between a resultant first state metric input value and said second state metric input value.

8. A two-way add/compare/select for improved channel speed for implementing high-speed and area efficient architectures for Viterbi detection of generalized partial response signals comprising:

a two-way compare for comparing first and second state metric input values;

a pair of two-way adds in parallel with said two-way compare for respectively adding said first and second state metric input values with a second input value;

a multiplexer coupled to said pair of two-way adds, said multiplexer receiving a selectable input controlled by said two-way compare; and a pair of shifts coupled between said pair of two-way adds and said multiplexer, said shifts receiving a shift control input for providing metric bounding to avoid underflow.

9. A two-way add/compare/select for improved channel speed for implementing high-speed and area efficient architectures for Viterbi detection of generalized partial response signals as recited in claim 8 wherein said second input value include a time varying term or a constant term.

10. A two-way add/compare/select for improved channel speed for implementing high-speed and area efficient architectures for Viterbi detection of generalized partial response signals as recited in claim 9 wherein said time varying term includes an output $Z_n$ of a partial matched filter or an output $W_n$ of a matched filter.

11. A two-way add/compare/select for improved channel speed for implementing high-speed and area efficient architectures for Viterbi detection of generalized partial response signals as recited in claim 8 wherein said compare includes a hard shift for providing an add for said first state metric input value and then a compare between a resultant first state metric input value and said second state metric input value.

12. A two-way add/compare/select for improved channel speed for implementing high-speed and area efficient architectures for Viterbi detection of generalized partial response signals as recited in claim 8 includes a latch coupled to an output of said multiplexer, said latch for holding a resultant state metric value.

\* \* \* \* \*